(12) United States Patent
Cho et al.

(10) Patent No.: US 10,079,977 B2
(45) Date of Patent: Sep. 18, 2018

(54) MOBILE TERMINAL AND CONTROL METHOD THEREOF

(71) Applicant: LG ELECTRONICS INC., Seoul (KR)

(72) Inventors: Taehoon Cho, Seoul (KR); Sanghyun Eim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 15/431,469

(22) Filed: Feb. 13, 2017

(65) Prior Publication Data

US 2017/0339347 A1 Nov. 23, 2017

(30) Foreign Application Priority Data

May 20, 2016 (KR) .................. 10-2016-0062318

(51) Int. Cl.
*H04N 5/232* (2006.01)
*G06F 3/0481* (2013.01)
(Continued)

(52) U.S. Cl.
CPC ....... *H04N 5/23293* (2013.01); *G06F 3/0488* (2013.01); *G06F 3/04817* (2013.01); *G11B 27/34* (2013.01); *H04N 5/23229* (2013.01)

(58) Field of Classification Search
CPC .... G06F 1/1643; G06F 1/1686; G06F 1/1694; G06F 3/04817; G06F 3/0488; G06F 3/167; G06F 3/041; G06F 3/04845; G06F 3/04883; G06F 17/30265; H04N 5/23293; H04N 5/232; H04N 5/23229;
(Continued)

(56) References Cited

U.S. PATENT DOCUMENTS 6,359,649 B1 * 3/2002 Suzuki ................ H04N 5/225
348/220.1
7,440,013 B2 * 10/2008 Funakura ........... G06K 9/00228
348/239

(Continued)

FOREIGN PATENT DOCUMENTS

KR 1020090111945 10/2009

OTHER PUBLICATIONS

PCT International Application No. PCT/KR2017/004801, Notification of Transmittal of the International Search Report and the Written Opinion of the International Searching Authority, or Declaration dated Aug. 8, 2017, 10 pages.

*Primary Examiner* — Pritham Prabhakher
(74) *Attorney, Agent, or Firm* — Lee Hong Degerman Kang & Waimey

(57) ABSTRACT

A mobile terminal includes a camera generating a preview image including a first object corresponding to a first subject and a second object corresponding to a second subject, a display unit displaying the preview image, and a controller capturing the preview image as a still image or video on the basis of an image capture command, wherein the controller links a first portion video to a region including the first object and links a second portion video to a region including the second object in the still image such that the first portion video including the first object and the second portion video are played in response to a play command regarding the still image.

20 Claims, 26 Drawing Sheets

(51) Int. Cl.
  *G06F 3/0488* (2013.01)
  *G11B 27/34* (2006.01)

(58) Field of Classification Search
  CPC ............. H04N 5/23245; H04N 1/2166; H04N 1/2116; H04N 1/212; H04N 1/2125; G11B 27/34; G06T 13/80; G06T 13/40; G06T 7/0081; G06T 7/20; G06T 2207/20148
  USPC ...................................................... 348/220.1
  See application file for complete search history.

(56) References Cited

U.S. PATENT DOCUMENTS

| | | | | |
|---|---|---|---|---|
| 7,474,348 B2* | 1/2009 | Suzuki | ................. | H04N 1/0044 348/207.1 |
| 9,743,033 B2* | 8/2017 | Kim | ........................ | H04N 5/93 |
| 9,787,890 B2* | 10/2017 | Cho | ........................ | G06F 3/0488 |
| 9,792,007 B2* | 10/2017 | Sirpal | ..................... | G09G 5/14 |
| 9,848,159 B2* | 12/2017 | Nakase | .................. | H04N 5/772 |
| 9,906,773 B2* | 2/2018 | Kim | ..................... | H04N 13/0242 |
| 9,922,439 B2* | 3/2018 | Sudheendra | ............ | G06T 13/80 |
| 9,953,680 B2* | 4/2018 | Kim | ..................... | G11B 27/036 |
| 2009/0256925 A1* | 10/2009 | Yoshizumi | ......... | G06K 9/00221 348/222.1 |
| 2010/0141826 A1* | 6/2010 | Thorn | .................... | G03B 13/32 348/345 |
| 2010/0182324 A1 | 7/2010 | Ko et al. | | |
| 2013/0154963 A1 | 6/2013 | Wang | | |
| 2013/0162853 A1* | 6/2013 | Kim | .................. | H04N 5/23245 348/220.1 |
| 2014/0092260 A1* | 4/2014 | Escobedo | ............ | H04N 1/2145 348/207.1 |
| 2015/0178318 A1 | 6/2015 | Lee et al. | | |
| 2015/0189221 A1* | 7/2015 | Nakase | .................. | G11B 27/30 386/225 |
| 2015/0334291 A1* | 11/2015 | Cho | ....................... | G06F 3/0488 348/222.1 |
| 2016/0027202 A1 | 1/2016 | Sudheendra et al. | | |
| 2016/0034574 A1* | 2/2016 | Kang | .................... | G06F 3/0482 715/720 |

* cited by examiner (a)

(b)

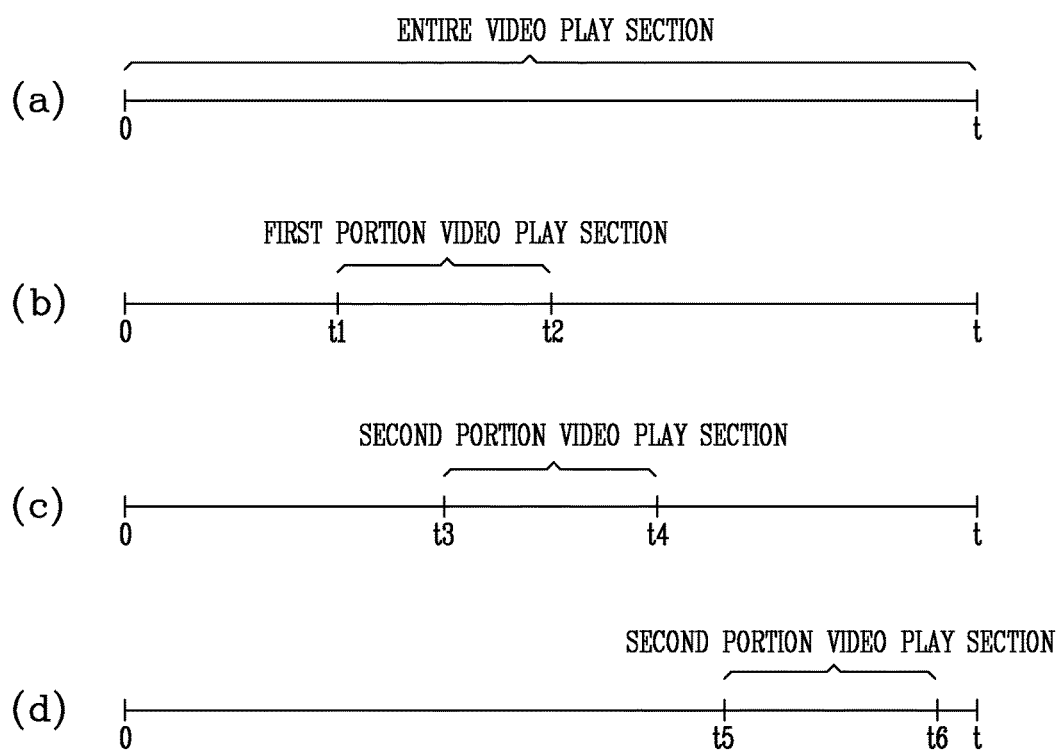

| FILE NUMBER | FILE TYPE |
|---|---|
| 1 | JPEG |
| 2 | AVI |
| 3 | HYBRID AVI 1 |
| 4 | HYBRID AVI 2 |

(a)            (b)

(a)

(b)

(d)

(c)

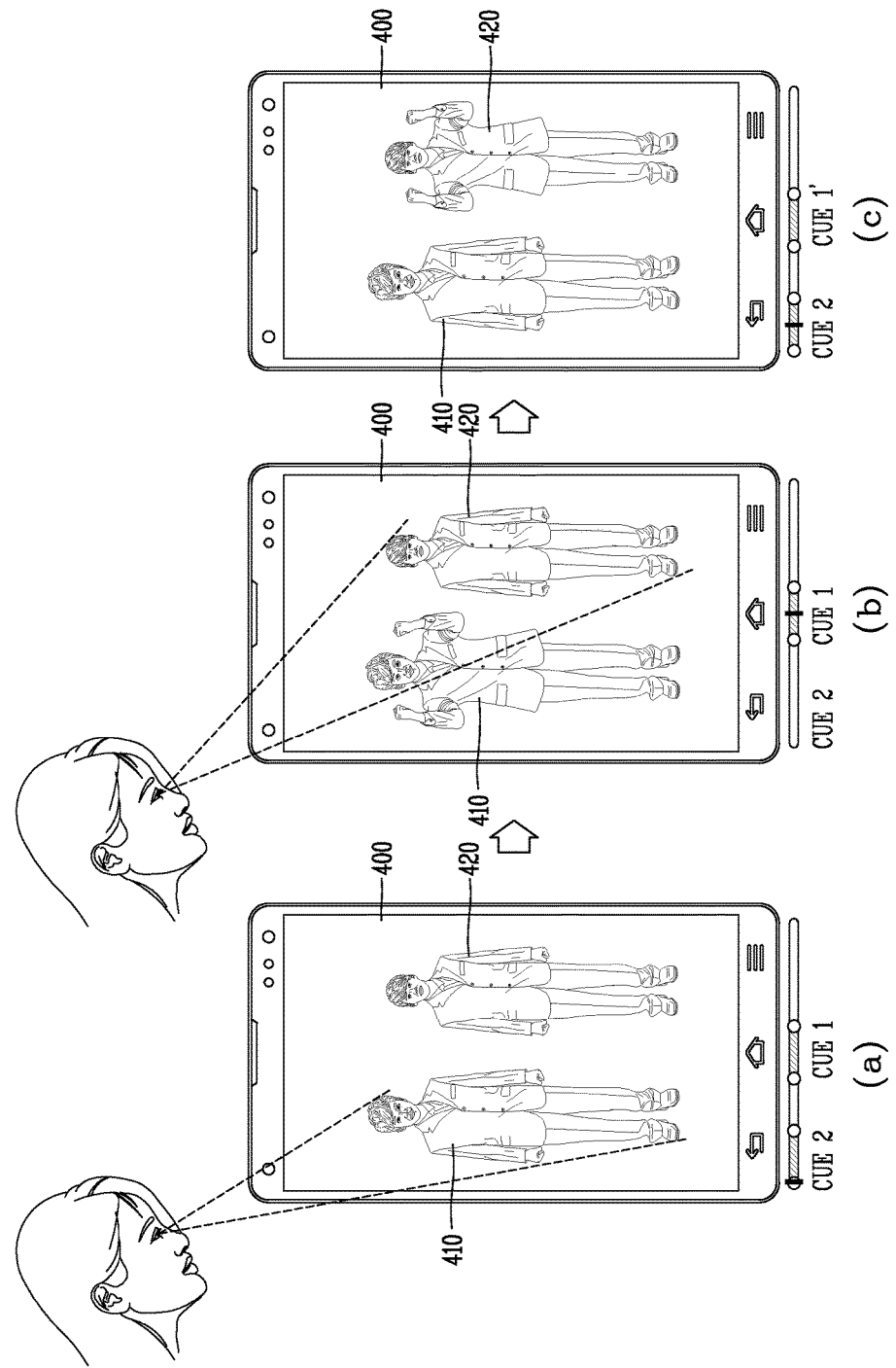

(a)  (b)

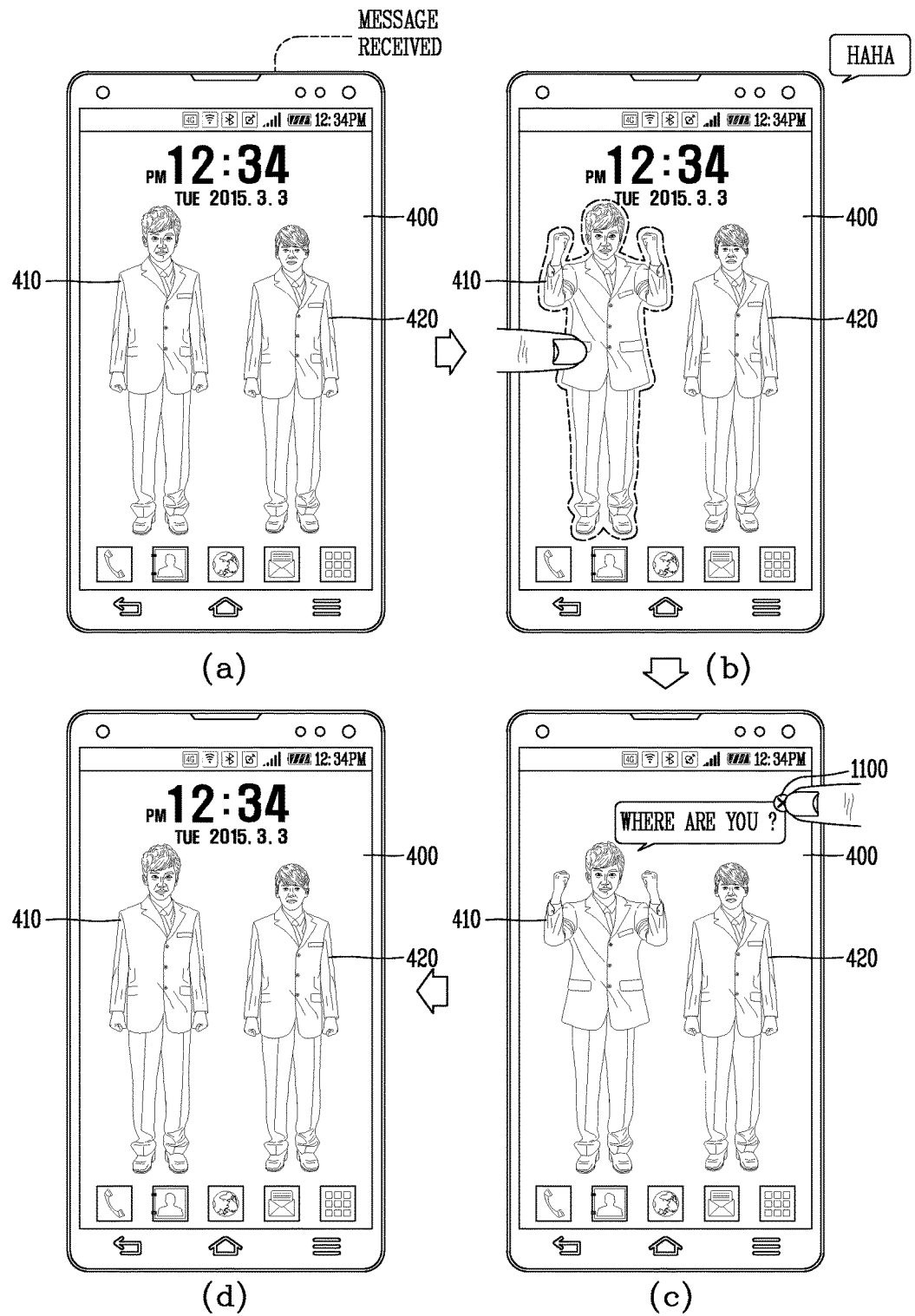

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2016-0062318, filed on May 20, 2016, the contents of which are all hereby incorporated by reference herein in its entirety.

BACKGROUND OF THE INVENTION

1. Field of the Invention

The present disclosure relates to a mobile terminal providing various forms of images and a control method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Efforts are ongoing to support and increase the functionality of mobile terminals. Such efforts include software and hardware improvements, as well as changes and improvements in the structural components.

Recently, in capturing photographs or videos through mobile terminals, functions of capturing a photograph or video in a new form different from those of existing photographs or videos have been developed. For example, a function of capturing a portion of a moving photograph or video, as a photograph, or the like, has been developed.

In line with the trend, the present disclosure proposes a method for providing an image in a new form, rather than existing photographs or videos.

SUMMARY OF THE INVENTION

Therefore, an aspect of the detailed description is to provide an image having a feeling of being alive (or vivid feeling).

Another aspect of the detailed description is to provide an image in a form of interacting with a user.

Another aspect of the detailed description is to provide a time-distorted image.

To achieve these and other advantages and in accordance with the purpose of this specification, as embodied and broadly described herein, a mobile terminal includes: a camera generating a preview image including a first object corresponding to a first subject and a second object corresponding to a second subject; a display unit displaying the preview image; and a controller capturing the preview image as a still image or video on the basis of an image capture command, wherein the controller links a first portion video to a region including the first object and links a second portion video to a region including the second object in the still image such that the first portion video including the first object and the second portion video are played in response to a play command regarding the still image.

In an embodiment, when a subject satisfying a preset condition, among the first subject and the second subject, is sensed, the controller may display a guide image indicating the subject satisfying the preset condition on the preview image.

In an embodiment, when an image capture command is applied after the first object, among the first object and the second object, is selected on the basis of a user request, the controller may link the first portion video including the first object to the still image.

In an embodiment, the first portion video may be video corresponding to a first play section of the video, and the second portion video may be video corresponding to a second play section different from the first play section.

In an embodiment, in a state in which a still image is displayed on the display unit, when a touch input is applied to a region of the still image in which the first object is displayed, the controller may play the first portion video.

In an embodiment, when the first portion video is played, the controller may continuously display the still image on the display unit.

In an embodiment, when playing of the first portion video is terminated, the controller may display the still image again.

In an embodiment, the controller may play different play sections of the first portion video on the basis of different touch inputs applied to the region in which the first object is displayed.

In an embodiment, when the first portion video is linked to the region in which the first object is displayed, the controller may display an icon indicating the linkage of the video in a vicinity of the region in which the first object is displayed.

In an embodiment, the mobile terminal may be in any one of a locked state in which receiving a control command is limited and a released state in which receiving a control command is not limited, and the controller may set the still image linked to the first portion video to a lock screen indicating a locked state.

In an embodiment, in a state in which the still image is displayed as a lock screen, when a touch input is applied to the region in which the first object is displayed, the controller may play the first portion video.

In an embodiment, the mobile terminal is set to have a security pattern for switching from a locked state to a released state, the first portion video and the second portion video may be linked to the still image, and when input of the security pattern is received, the controller may play the first portion video and the second portion video in certain order.

In an embodiment, when occurrence of a specific event is sensed, the controller may play the first portion video.

In an embodiment, after occurrence of the specific event, when different touch inputs are applied to the region in which the first object to which the first portion video is linked is displayed, the controller may execute different functions.

In an embodiment, when a first touch input is applied to the region in which the first object is displayed, the controller may display summary information related to the specific event, and when a second touch input different from the first touch input is applied to the region in which the first object is displayed, the controller may display an execution screen of an application related to the specific event.

To achieve these and other advantages and in accordance with the purpose of this specification, as embodied and broadly described herein, a method for controlling a mobile terminal includes: displaying a preview image including a first object corresponding to a first subject and a second object corresponding to a second subject input through a camera; capturing the preview image as a still image and video on the basis of an image capture command; generating a composite image by linking at least a portion of the captured video to the captured still image, wherein the video includes a first portion video including the first object and a second portion video including the second object, and the composite image is an image obtained by linking a first portion video to a region including the first object and linking a second portion video to a region including the second object in the still image such that the first portion video including the first object and the second portion video are played in response to a play command regarding the still image.

In an embodiment, in the displaying of the preview image, when a subject satisfying a preset condition, among the first subject and the second subject, is sensed, a guide image indicating the subject satisfying the preset condition may be displayed on the preview image.

In an embodiment, the method may further include: after the still image is linked to the first and second portion videos, playing the first portion video in response to a touch input applied to a region of the still image in which the first object is displayed.

In an embodiment, when the first portion video is played, the still image may be continuously displayed on the display unit.

In an embodiment, in the playing of the first portion video, different play sections of the first portion video may be played on the basis of different touch inputs applied to the region in which the first object is displayed.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 3A to 3D are conceptual views illustrating the control method of FIG. 2.

FIGS. 9A to 9D are conceptual views illustrating a method of playing a partial video associated with a captured still image a mobile terminal related to the present disclosure.

FIGS. 11A and 11B are conceptual views illustrating embodiments in which a captured still image is provided as a background image of a home screen page a mobile terminal related to the present disclosure.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
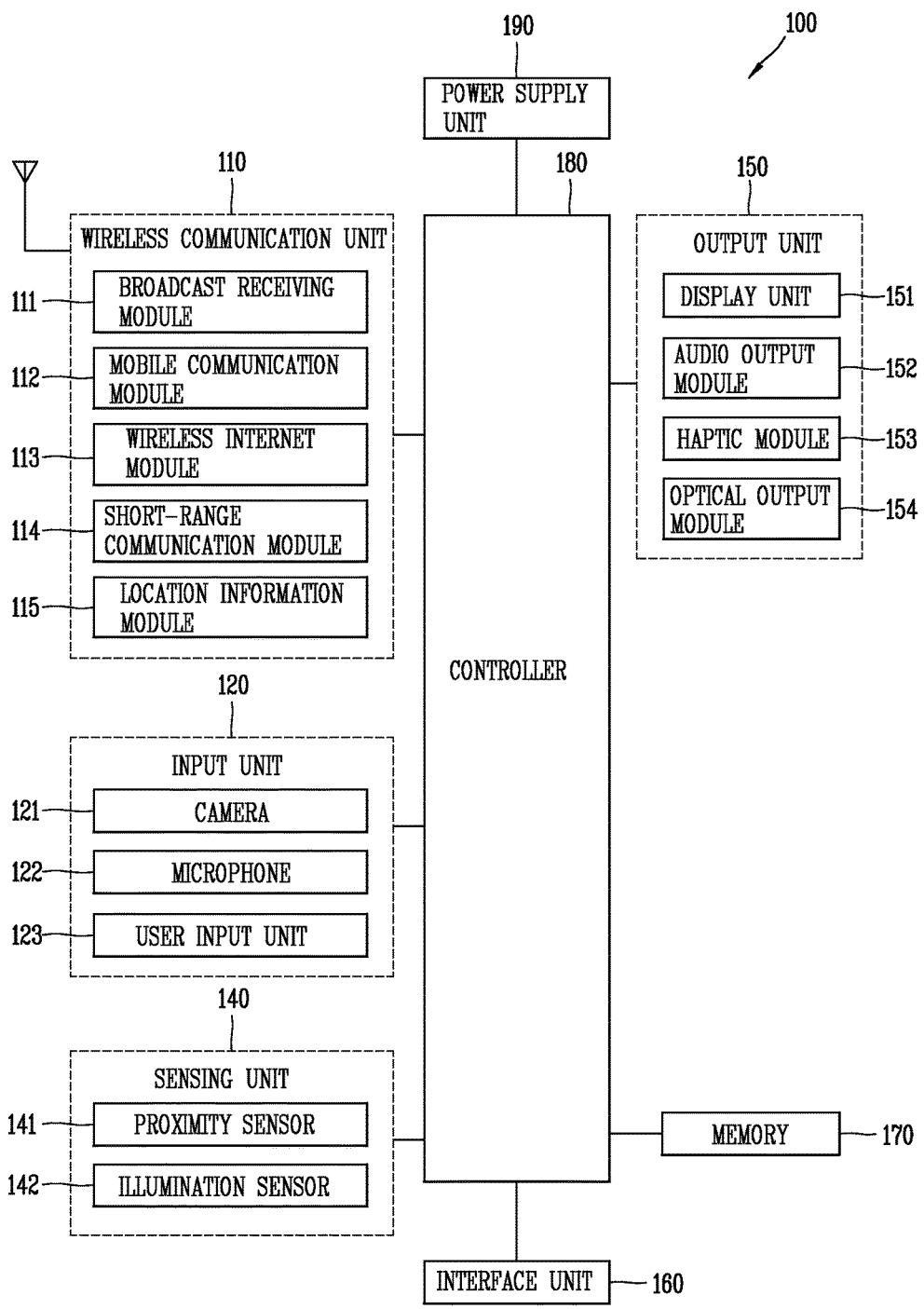
FIG. 1A is a block diagram of a mobile terminal in accordance with the present disclosure.
Figure 1B:
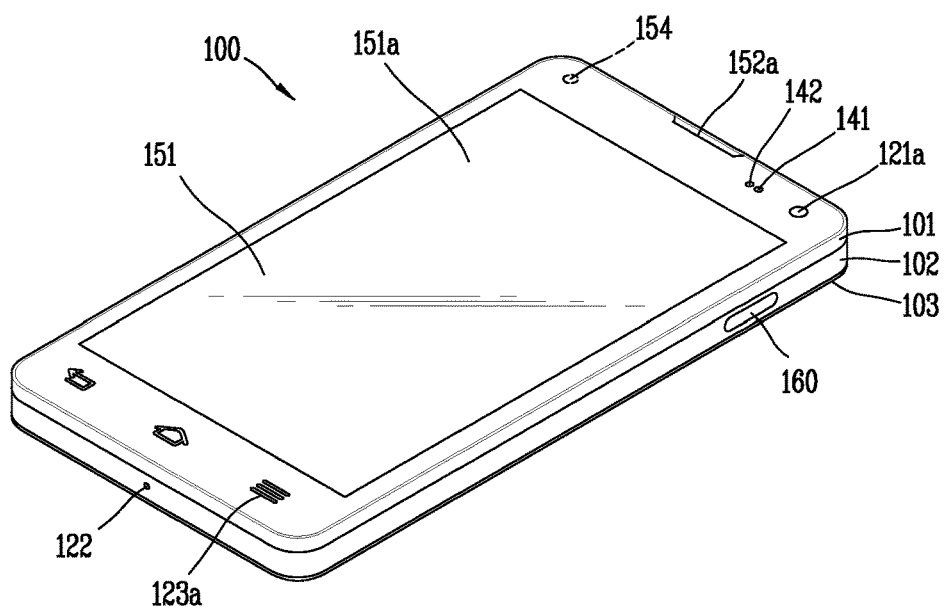
FIGS. 1B and 1C are conceptual views of one example of the mobile terminal, viewed from different directions.
Figure 1C:
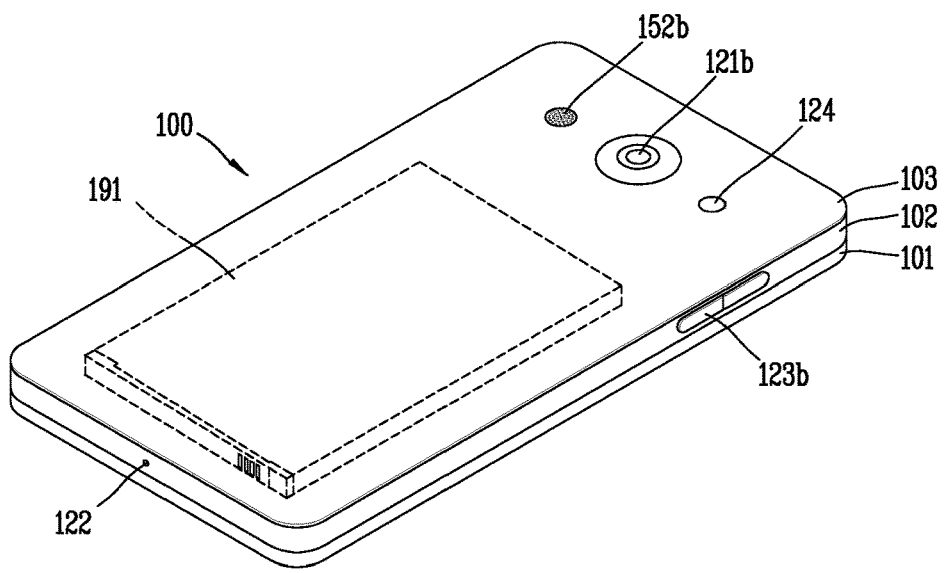

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a locked state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
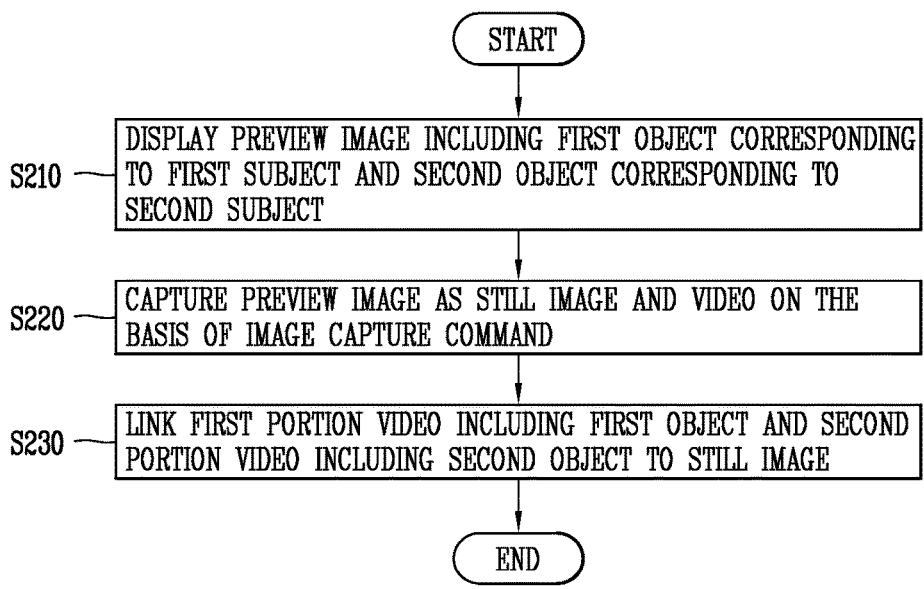
FIG. 2 is a flow chart illustrating a control method of capturing an image in a mobile terminal related to the present disclosure.

Hereinafter, a method of generating an image of a new form through a camera of a mobile terminal having at least one of the aforementioned components will be described with reference to the accompanying drawings. FIG. 2 is a flow chart illustrating a control method of capturing an image in a mobile terminal related to the present disclosure, and FIGS. 3A to 3D are conceptual views illustrating the control method of FIG. 2.

Referring to FIG. 2, the controller 180 of the mobile terminal according to the present disclosure may display a preview image including a first object corresponding to a first subject and a second object corresponding to a second subject (S210).

In order to receive image data from the camera 121, the controller 180 may activate the camera 121. Activation of the camera 121 refers to operating the camera 121 to receive image data of a subject through an image sensor. Conversely, deactivation of the camera 121 refers to not operating the camera 121 not to receive image data of the subject through the image sensor of the camera 121.

In the mobile terminal according to the present disclosure, a camera application may be installed in order to activate the camera. The camera application is an application program performing a function of displaying a preview image corresponding to image data input from the camera on the display unit 151. Also, the camera application may also perform a function of converting images captured through the camera into images of various forms.

The controller 180 may execute the camera application on the basis of a user request to activate the camera. When the camera is activated, the controller 180 may display a preview image corresponding to image data input from the camera. The preview image may be an image which to be captured, which is previously displayed through the display unit 151 before an image is captured. For example, as illustrated in (a) of FIG. 3A, the controller 180 may display a preview image 300 corresponding to image data input through the camera 121, on the display unit 151.

The preview image may include objects corresponding to a subject. IN this disclosure, a subject refers to a term indicating an object as a target to be captured, which includes a person, a thing, and the like. For example, as illustrated in (a) of FIG. 3A, the preview image may include a first object corresponding to a first subject 310 and a second object corresponding to a second subject 320.

Hereinafter, a case in which the first and second subjects are included in a preview image will be described unless otherwise mentioned, but the present disclosure is not limited thereto and may also be applied to any case in which there are one or more subjects.

Meanwhile, the camera application installed in the mobile terminal of the present disclosure may capture an image in any one of a plurality of image capture modes in which images of different forms are captured.

The image capture mode is a function of capturing an image according to a preset camera set value to capture images of various forms. For example, the image capture mode may include an automatic scene mode in which imaging is performed by an appropriate camera set value by automatically analyzing an image capture environment, a night scene view in which imaging is performed by a camera set value to minimize noise in a dark environment in which a quantity of light is small, and a continuous image capture mode in which several photographs are continuously taken.

Also, the camera application installed in the present disclosure may provide a cinema graph mode in which video is captured together with capturing a still image, as an image capture mode. The cinema graph mode is a mode in which an image is captured such that a portion of a still image moves. Thus, an image captured in the cinema graph mode may be a composite image formed as a portion of the still image is replaced with video, or an image formed as association information associated with video is stored in a portion of the still image. In this case, the image captured in the cinema graph mode may be shown such that the portion associated with the video moves on the still image. Hereinafter, all the images formed as video replaces or is associated with a portion of the still image will be described as images captured in the cinema graph mode.

Meanwhile, the composite image captured in the cinema graph mode may be termed a cinema graph image, an animation photo, or a moving image. Meanwhile, the present disclosure is not limited thereto and the composite image will be described by a general term of an image captured in the cinema graph mode or a composite image.

The controller 180 may set the camera to capture an image in a specific image capture mode among a plurality of image capture modes on the basis of a user request. In detail, the user may select a specific image capture mode before capturing an image, in a state in which the camera application is executed. For example, as illustrated in (a) of FIG. 3A, graphic objects 210 and 220 for selecting an image capture mode on the preview image input from the camera 121. The user may select the graphic object 220 indicating the cinema graph mode among the graphic objects 210 and 220 for selecting an image mode to enter the cinema graph mode.

In this case, the controller 180 may change a set value of the camera such that an image may be captured in the cinema graph mode selected by the user. Hereinafter, it is assumed that an image is captured in a state in which the cinema graph mode is set by the user.

In a state in which the preview image is displayed, the controller 180 may capture the preview image as a still image or video on the basis of an image capture command (S220).

When an image capture command for capturing an image is input, the controller 180 may capture an image on the basis of image data input through the camera 121. The image capture command may be input in various manners. For example, the image capture command may be input according to various schemes such as a touch scheme, a gesture scheme, a sound input scheme, and the like.

For example, the user may touch the preview image to input an image capture command for the preview image.

Meanwhile, when the image capture command is input, the controller 180 may capture an image according to a currently set image capture mode. That is, when the currently set image capture mode is the cinema graph mode, the controller 180 may capture a still image and video on the basis of the image capture command.

Figure 3A:
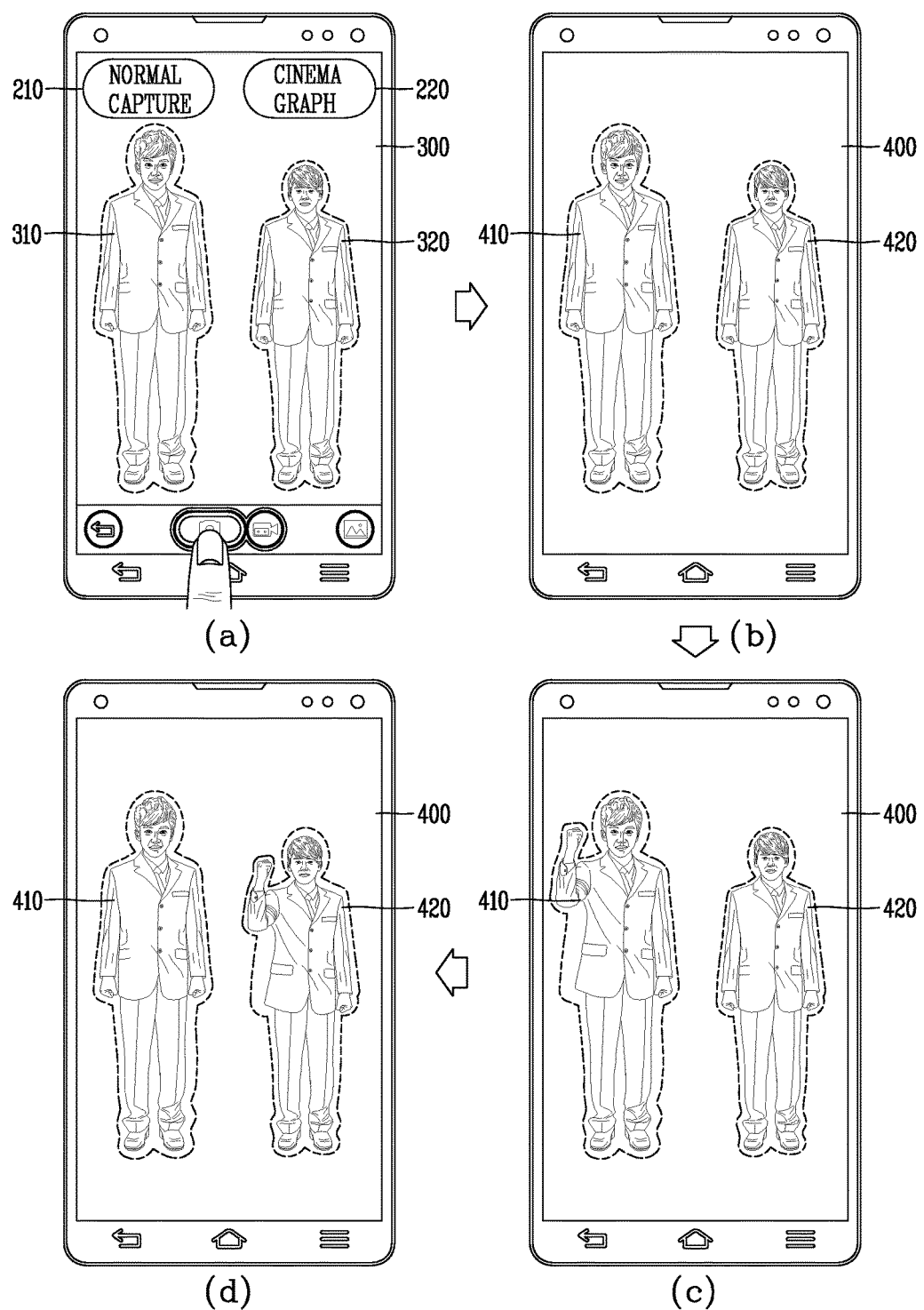
Figure 3B:
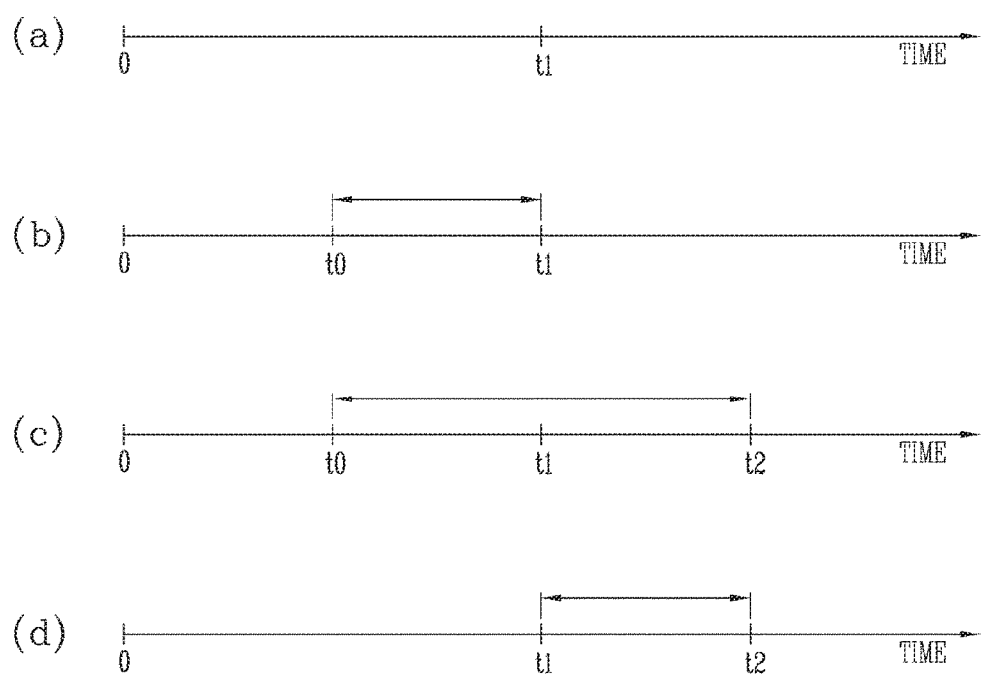
Figure 3C:
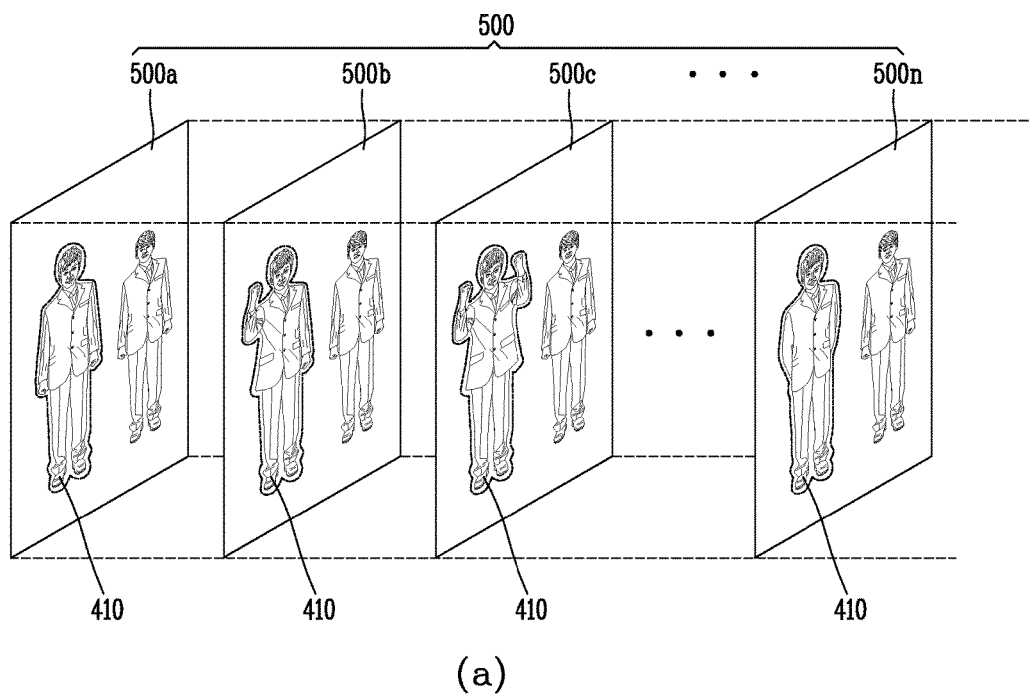
Figure 3C:
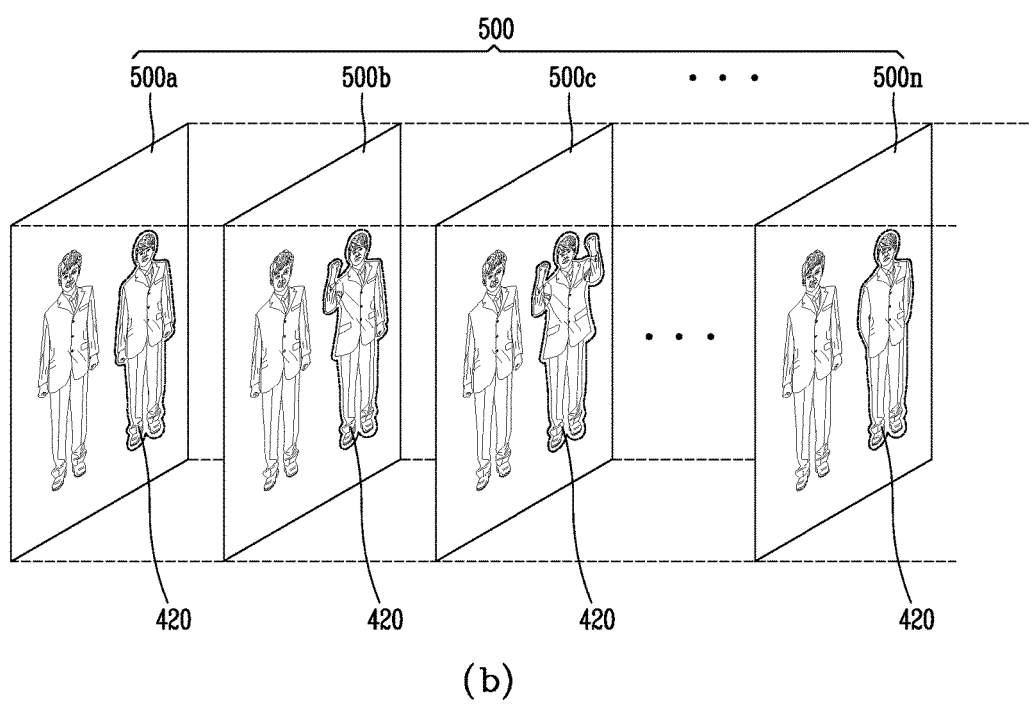

In detail, as illustrated in (a) of FIG. 3B, when an image capture command is input, the controller 180 may capture a preview image input from the camera at a point in time t1 at which the image capture command is input, as a still image. Or, the controller 180 may capture a still image by a preset number of times at a predetermined interval during a preset time section from the point in time t1 at which the image capture command is input. This follows a set value set in the cinema graph mode.

Also, the controller 180 may capture video with respect to the point in time t1 at which the image capture command is input together with the still image.

The controller 180 may capture the video in various image capture sections. In detail, as illustrated in (b) of FIG. 3B, the controller 180 may capture video from a point in time t0 earlier than the point in time t1 at which the image capture command is input to the point in time t1 at which the image capture command is input.

Or, as illustrated in (c) of FIG. 3B, the controller 180 may capture video from the point in time t0 earlier than the point in time t1 at which the image capture command is input to a point in time t2 later than the point in time t1 at which the image capture command is input.

Or, as illustrated in (b) of FIG. 3B, the controller 180 may capture video from the point in time t1 at which the image capture command is input to the point in time t2 later than the point in time t1 at which the image capture command is input.

An image capture section of the video may be set by the user or may be set when the mobile terminal is released from a factory.

Unlike the case in which the controller 180 may capture video on the basis of an image capture command, alternatively, when the cinema graph mode is set, video may be automatically captured in background even without an image capture command. In the present disclosure, both the two cases may be included.

Meanwhile, the controller 180 may set a region to be replaced with video in advance before capturing an image, and capture a still image or video. In this case, in order to effectively detect movement of a region to be replaced with video, the controller 180 may set a focal point of video to a position corresponding to a region to be replaced with the video and capture video.

After the still image and the video are captured, the controller 180 of the mobile terminal according to the present disclosure may link a first portion video including a first object and a second portion video including a second object to the still image (S230).

After the still image and the video are captured, the controller 180 may link the video to a region of the still image such that the video may be played (or reproduced) in the region of the still image.

In detail, the controller 180 may replace a region of the still image with video to generate a composite image. Or, the controller 180 may store matching information obtained by matching a specific video to a region of the still image such that the video may be played in one region of the still image. In this manner, the user may view that the region of the still image moves.

Meanwhile, the controller 180 may link different videos to a plurality of regions of the still image. That is, the controller 180 may link different videos to different regions of the still image such that the different regions are moved.

For example, as illustrated in (b) of FIG. 3A, the still image may include a first object 410 corresponding to a first subject and a second object 420 corresponding to a second subject. Here, the controller 180 may link different videos to the region in which the first object 410 is displayed and the region in which the second object 420 is displayed.

In detail, the controller 180 may link the first portion video including the first object 410 to the region in which the first object 410 is displayed and a second portion video including the second object 420 to the region in which the second object 420 is displayed.

Here, the first portion video may be a partial video including the first object of the captured video, and the second portion video is a partial video including the second object of the captured video. Referring to (a) of FIG. 3C, the first portion video may be a partial video produced by extracting the region including the first object 410 from a plurality of images 500a, 500b, 500c, . . . , 500n. Similarly, referring to (b) of FIG. 3C, the second portion video may be a partial video produced by extracting the region including the second object 420 from a plurality of images 510a, 510b, 510c, . . . , 510n.

Also, the controller 180 may link a first portion video and a second portion video having the same reproduction section (or play section) (section from 0 to t of (a) of FIG. 3D) to the still image.

Or, the controller 180 may associate a first portion video and a second partial having different play sections to the still image.

For example, the video captured together with the still image may have a play section from 0 to t as illustrated in (a) of FIG. 3D. Here, the controller 180 may extract a partial video corresponding to a first play section from t1 to t2 as illustrated in (b) of FIG. 3D from the first portion video. Also, the controller 180 may extract a partial video corresponding to a second play section from t3 to t4 as illustrated in (c) of FIG. 3D from the second portion video. Here, the first play section and the second play section may overlap in a partial section (a section from t3 to t2). Or, the controller 180 may extract a partial video corresponding to a third play section from t5 to t6 as illustrated in (d) of FIG. 3D, a section which does not overlap the first play section of the second portion video.

That is, a plurality of videos linked to the still image may have different play sections. In this manner, in the present disclosure, the videos captured at different points in time may be linked to the still image captured at a single point in time.

In a case in which the plurality of videos are linked to the still image, the controller 180 may play each of the plurality of videos. That is, the controller 180 may independently play the first portion video and the second portion video linked to the still image.

For example, as illustrated in (b) and (c) of FIG. 3A, the controller 180 may play the first portion video linked to the still image and may not play the second portion video. Thereafter, as illustrated in (c) and (d) of FIG. 3, the controller 180 may play the second portion video linked to the still image and may not play the first portion video.

Meanwhile, although not shown, the controller may provide an animation effect to the first portion video and the second portion video. For example, the controller 180 may provide a fade-in effect at a start point of each video and provide a fade-out effect at an end point of each video.

In this manner, although the still image captured at a specific point in time, since each portion is provided in the form of being captured at different points in time, and thus, the user may be provided with a still image in a time-distorted form.

The images captured in the cinema graph mode may be variously utilized in the mobile terminal. For example, the user may utilize a composite image captured in the cinema graph mode, as a background image. This utilization method will be described in detail with reference to FIGS. 10 and 11.

In the above, the method of capturing an image in the cinema graph mode in the mobile terminal according to the present disclosure has been described. In this manner, the present disclosure may provide an image having a feeling that interacts with the user.

Figure 4A:
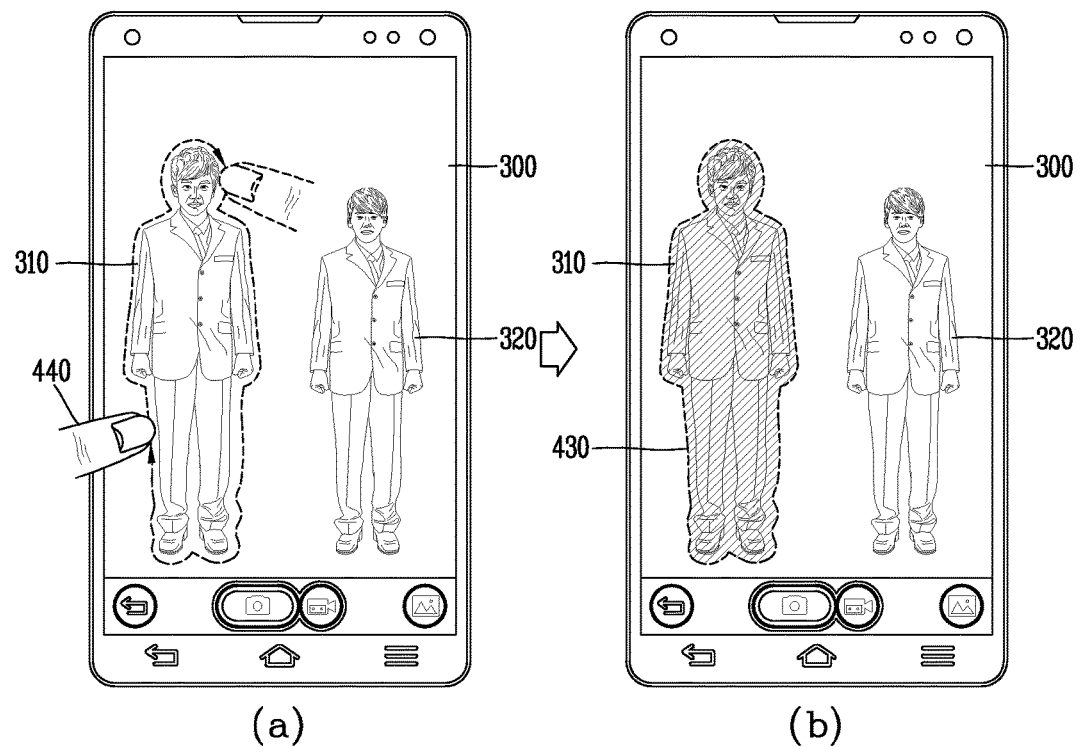
FIGS. 4A to 4C are conceptual views illustrating a method of selecting an object when an image is captured in a mobile terminal related to the present disclosure.
Figure 4B:
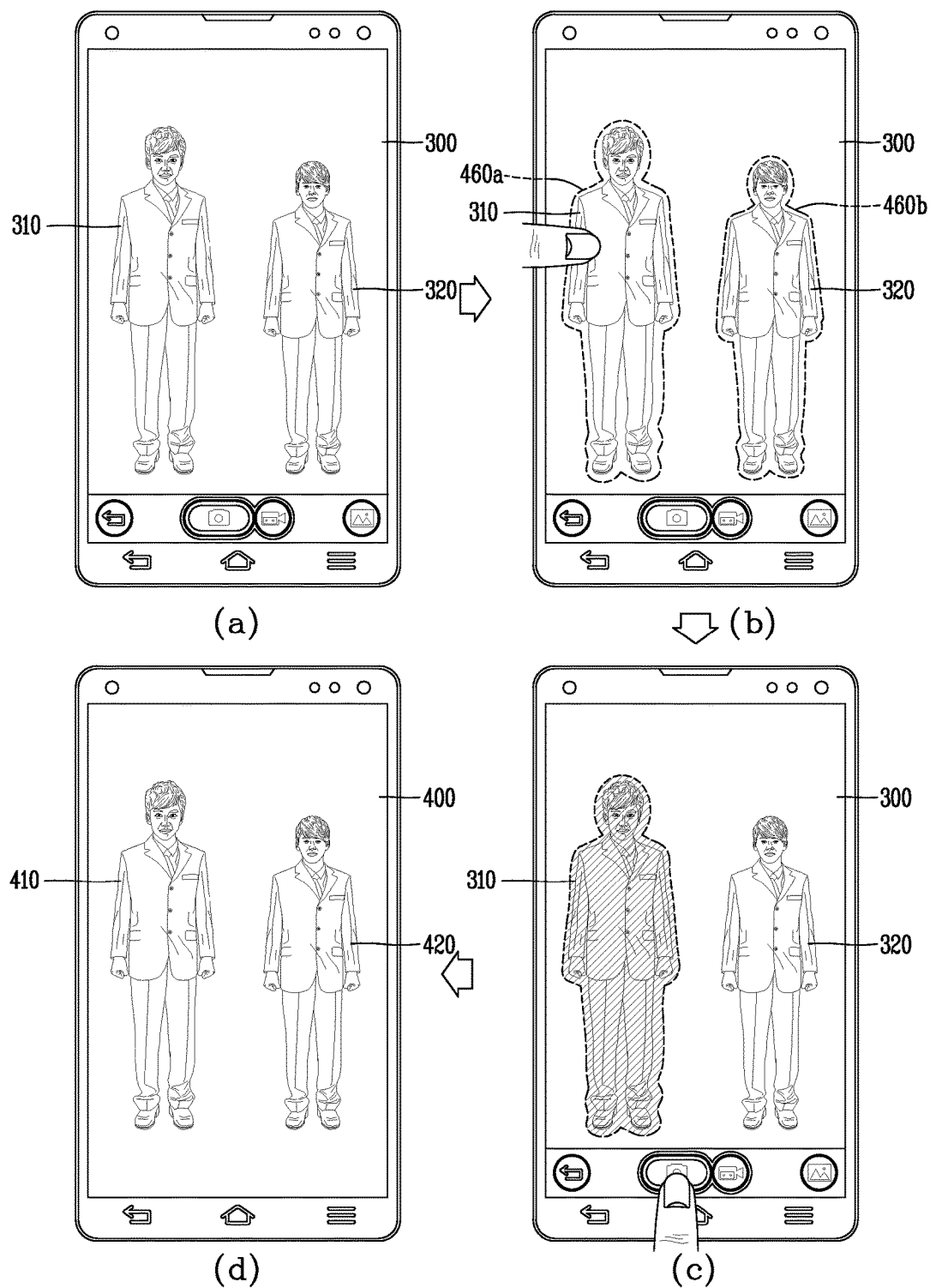
Figures 4C, 5:
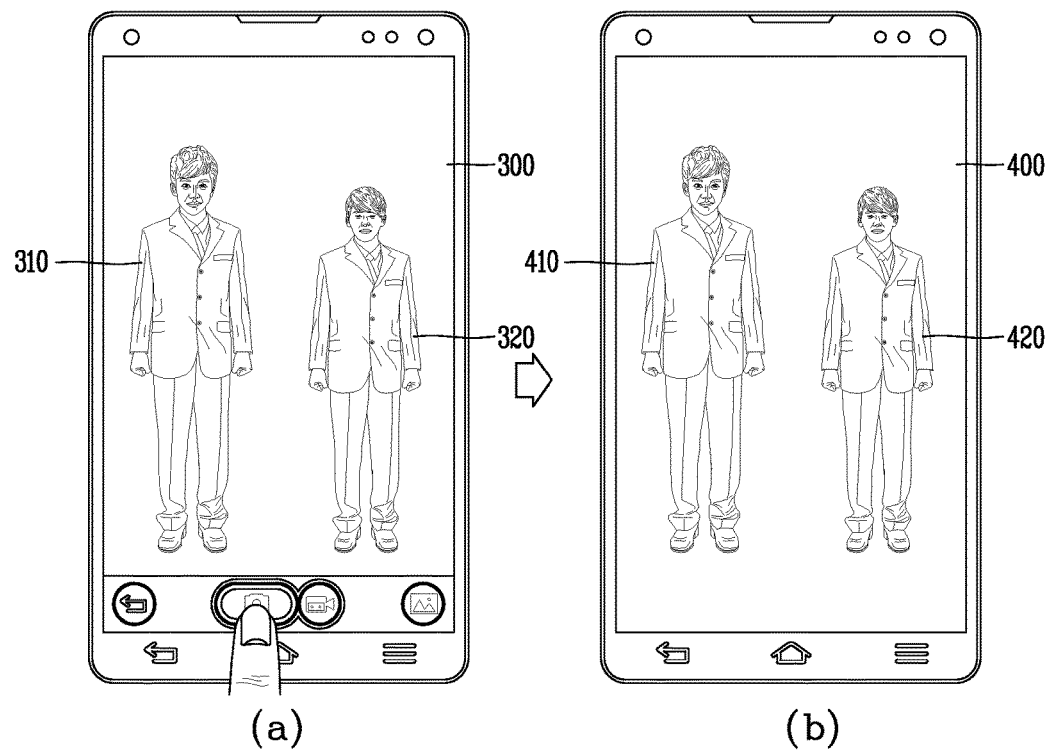
FIG. 5 is a view illustrating a form in which a captured image is stored in a mobile terminal related to the present disclosure.

Hereinafter, a method of selecting a region from a captured still mage to which video is to be linked in the cinema graph mode will be described. FIGS. 4A to 4C are conceptual views illustrating a method of selecting a region from a captured still image to which video is to be linked in the in the cinema graph mode in a mobile terminal related to the present disclosure. Also, FIG. 5 is a view illustrating a form in which a captured image is stored in a mobile terminal related to the present disclosure.

In a state in which a preview image input from the camera 121 is displayed on the display unit 151, the controller 180 may enter the cinema graph mode on the basis of a user request.

When the controller 180 enters the cinema graph mode, the controller may previously set a subject as a target of movement on a still image in a preview image before capturing an image. In this case, when capturing an image, the controller 180 replace a region of the still image in which the subject is displayed with a partial video including the subject.

The subject may be selected by the user.

For example, referring to (a) of FIG. 4A, the controller 180 may sense that a touch input 440 for selecting a subject is applied on the preview image.

The touch input 440 may be a touch input applied as a touch trace forms a closed curve. In this case, as illustrated in (b) of FIG. 4A, the controller 180 may set a subject 310 included in an inner area 430 of the closed curve as a subject to be a target for a movement. In this manner, the user may select the subject as a target of a movement in advance before capturing an image.

When the subject 310 is selected, the controller 180 may track a movement of the selected subject 310 in the preview image. That is, the controller 180 may sense a movement of the subject through the camera 121.

Meanwhile, when the controller 180 enters the cinema graph mode, the controller 180 may recommend the user a subject to be moved in the still image before capturing an image.

To this end, first, the controller 180 may determine whether there is a subject which satisfies a preset condition, among a plurality of subjects included in the preview image.

The preset condition may be a condition related to a movement of a subject, face recognition, a type of a subject, and the like. In another example, the preset condition may be a condition of a subject having the same face information as face information previously stored in a database.

Thereafter, when it is determined that there is a subject which satisfies the preset condition, the controller 180 may display a guide image indicating the subject satisfying the preset condition on the preview image.

For example, as illustrated in (a) of FIG. 4B, the controller 180 may sense a first subject 310 and a second subject 320 on the preview image. Here, the controller 180 may determine whether there is a subject satisfying the preset condition, among the first and second subjects 310 and 320.

When the first and second subjects 310 and 320 satisfy the preset condition, as illustrated in (b) of FIG. 4B, the controller 180 may display guide images 460a and 460b respectively indicating the first and second subjects 310 and 320 on the preview image 300.

The guide images 460a and 460b may be displayed respectively in regions in which the first and second subjects 310 and 320 are displayed. Also, the guide images 460a and 460b may be moved together when the first and second subjects 410 and 420 are moved. In this manner, the user may previously select subjects to be shown in a moving form from the still image before capturing an image.

In a state in which the guide images 460a and 460b are displayed, when a user input for selecting a specific guide image is applied, the controller 180 may set a region in which a specific subject is displayed as a region to be replaced with video. For example, as illustrated in (c) of FIG. 4B, when a touch input is applied to the guide image 460a indicating the first subject 310, the controller 180 may set the region in which the first subject 310 is displayed as a region to be linked to video.

Thereafter, when a still image and video are captured in response to an applied image capture command, the controller 180 may generated a composite image by replacing the region of the still image, in which the set specific subject is displayed, set as a region to be linked to the video, with video. In this manner, the user may recognize an appropriate subject as a target of a movement, as well as selecting the moving subject in advance, before capturing an image.

Meanwhile, the controller 180 may capture a still image and video without previously selecting a specific subject to be moved from the still image. That is, as illustrated in FIG. 4C, when an image capture command is applied without selecting a specific subject, the controller 180 may capture a still image and video. In this case, after capturing the still image and the video, the controller 180 may perform an editing process to generate a composite image.

Meanwhile, when the still image and the video are captured in the cinema graph mode, the controller 180 may store the captured still image and video.

Here, the controller 180 may separately store the captured still image and video, both having the same file name. Also, the controller 180 may separately store a composite image obtained by composing the still image and the video having the same file name. Here, as illustrated in FIG. 5, the controller 180 may generate file numbers such that the still image, the video, and the composite image are related images.

Also, a file type appropriate for each of the still image, the video, and the composite image may be stored. For example, when stored, the still image may have an extension of JPEG, the video may have an extension of AVI, and the composite image may have an extension of Hybrid AVI.

In a case in which the still image, the video, and the composite image are stored by separate file numbers, editing may be performed on the respective images. In detail, the controller 180 may separately share the still image, the video, and the composite image with any other terminal.

Also, the controller 180 may separately delete the still image, the video, and the composite image. For example, when the controller 180 deletes the still image according to a user request, the controller 180 may not delete the video and the composite image.

Also, the controller 180 may separate the composite image into the still image and the video. For example, on the basis of a linking release command, the controller 180 may separate the composite image into the still image and the video and separately store the same.

The file storing form includes a form that can be obviously changed by a person in the art from the above description.

In the above, the method of selecting a subject to be moved from the still image before capturing an image, in capturing an image in the cinema graph mode according to the present disclosure has been described.

Figure 6A:
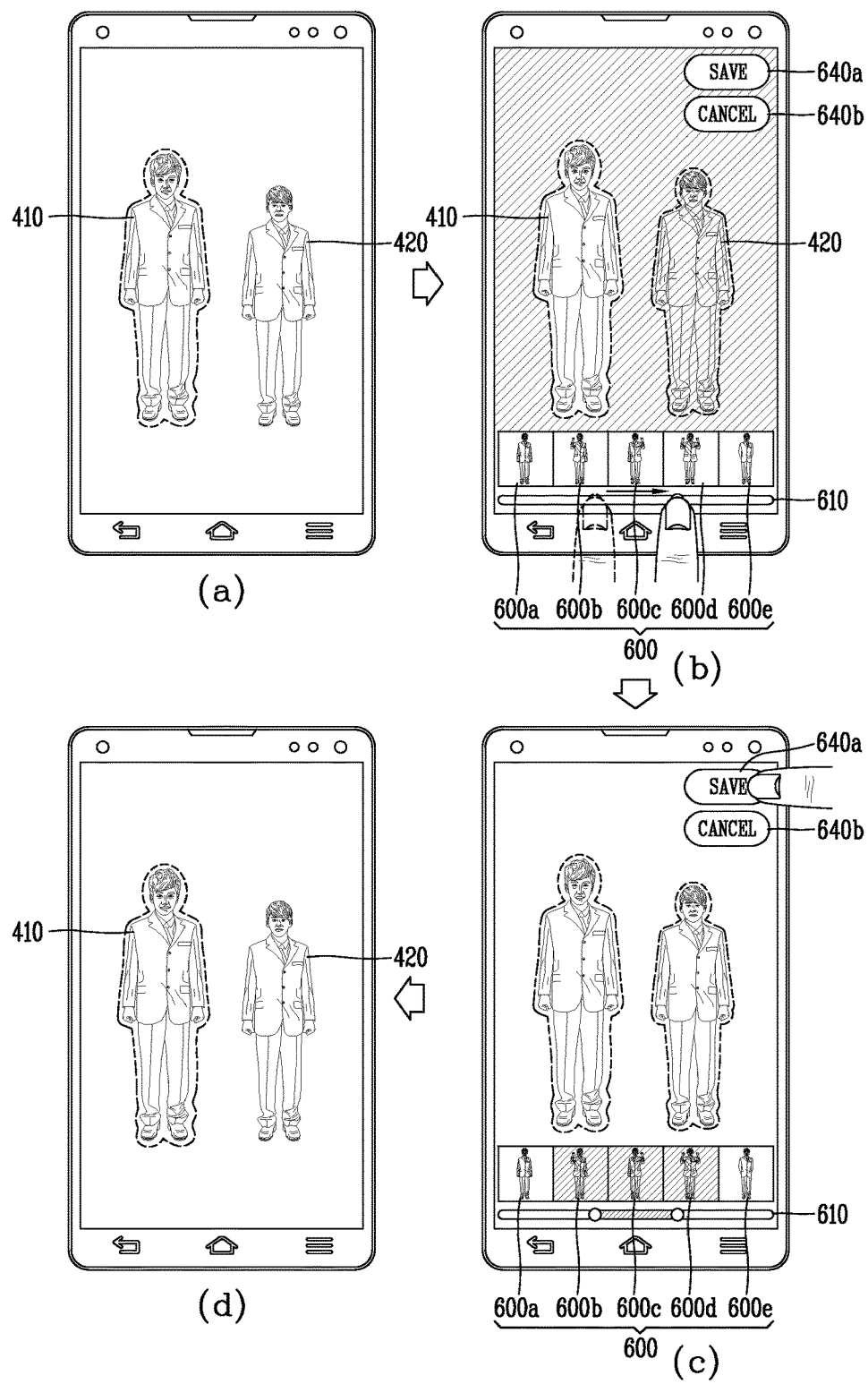
FIGS. 6A to 6C are conceptual views illustrating a method of trimming partial video to be linked to a still image in a mobile terminal related to the present disclosure.
Figure 6B:
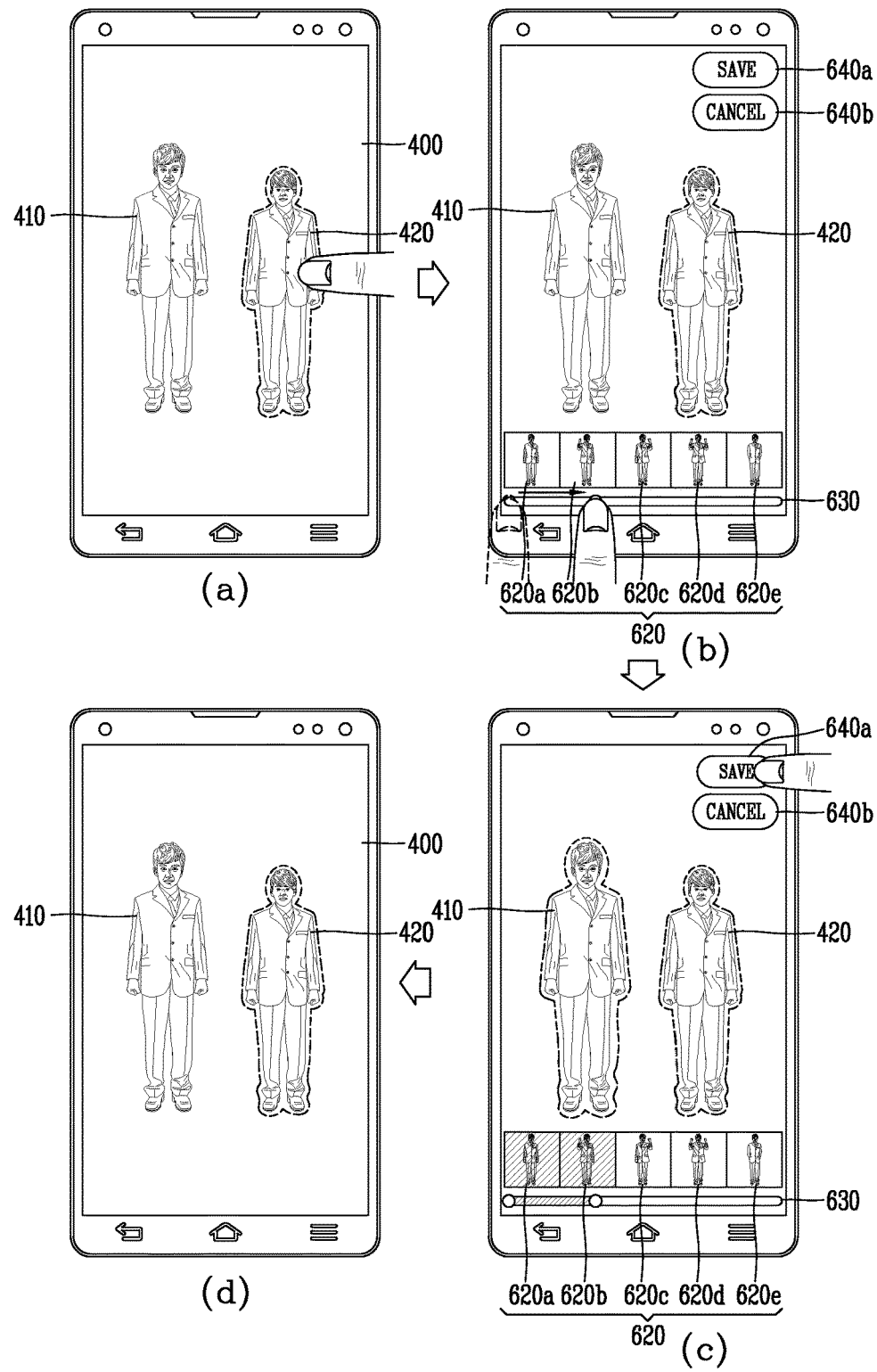
Figure 6C:
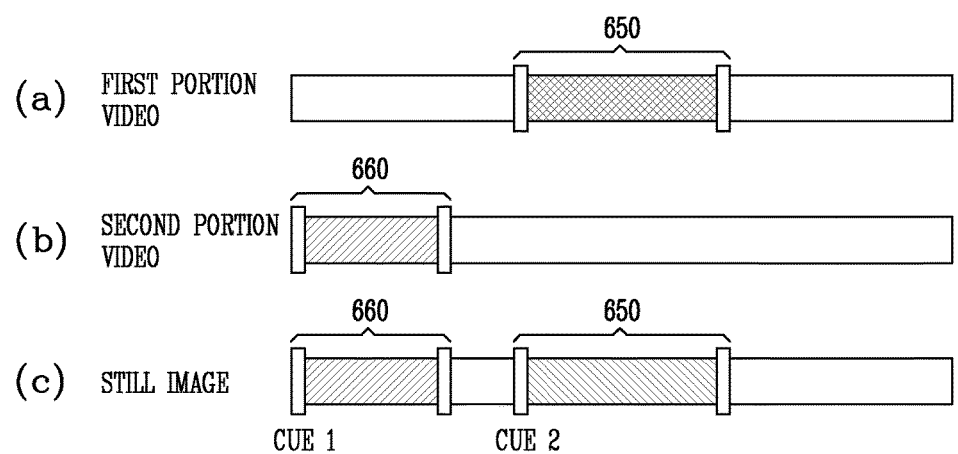

FIGS. 6A to 6C are conceptual views illustrating a method of trimming partial video to be linked to a still image in a mobile terminal related to the present disclosure.

When a still image and video are captured in the cinema graph mode, the controller 180 may perform a step of editing on video to be linked to the still image.

First, the controller 180 may extract at least a portion of video to be linked to the still image from the captured video on the basis of a user's control command.

The user may select i) a partial screen including a specific subject from the entire screen of the video or may select ii) a partial play section of the entire play section of the video. Also, the user may select a partial screen and a partial play section.

For example, as illustrated in (a) of FIG. 6A, the controller 180 may sense that a touch input for selecting a first object 410 is applied to a still image including the first object 410 corresponding to a first subject and a second object 420 corresponding to a second subject. In this case, the controller 180 may extract a first portion video including the first object 410.

Thereafter, as illustrated in (b) of FIG. 6A, in order to edit a play section of the first portion video 600, the controller 180 may display representative images 600a, 600b, 600c, 600d, and 600e among a plurality of images forming the first portion video 600 on the display unit 151. Here, the representative images may be images automatically extracted according to a preset condition among the plurality of images forming the first portion video 600. For example, the representative images may be images corresponding to start points of respective time sections after the first portion video 600 is divided by a plurality of time sections. The user may previously view a portion of the first portion video 600 through the representative images, and thus, the user may select a play section of the first portion video 600 through preview. The images forming the video may also be termed a frame.

Also, a progress bar 610 indicating a play section may also be displayed together at lower ends of the representative images. The progress bar 610 is a graphic object indicating a timeline of video.

Here, the plurality of images forming the video may be displayed at positions corresponding to time of the progress bar 610. For example, the representative images 600a, 600b, 600c, 600d, and 600e may be displayed at positions indicating a time at which they are played in the time indicated by the progress bar 610.

As illustrated in (b) of FIG. 6A, the controller 180 may sense that a touch input is applied to some images 600b, 600c, and 600d among the representative images 600a, 600b, 600c, 600d, and 600e. In this case, the controller 180 may extract video having a play section corresponding to the some images 600b, 600c, and 600d of the first portion video 600, as video to be linked to a still image.

Also, as illustrated in (c) of FIG. 6A, the controller 180 may display the selected some images 600b, 600c, and 600d such that the images 600b, 600c, and 600d are visually differentiated from the other images 600a and 600e.

Thereafter, as illustrated in (c) of FIG. 6A, in response to a touch input applied to a storage icon 640a for storing the extracted video, the controller 180 may link the extracted video to the still image.

That is, as illustrated in (d) of FIG. 6A, the controller 180 may generate a composite image by linking the extracted video to the region in which the first object 410 is displayed.

Similarly, the controller 180 may perform controlling on the second object 420, not the first object 410, in the same manner.

That is, as illustrated in (a) of FIG. 6B, when a touch input for selecting the second object 420 is applied, the controller 180 may extract a second portion video 620 including the second object 420.

Thereafter, as illustrated in (b) of FIG. 6B, in order to edit the play section of the second portion video 620, the controller may display the representative images 620a, 620b, 620c, 620d, and 620e, among the plurality of images forming the second portion video 620, and a progress bar 630 on the display unit 151.

Here, when a touch input is applied to some images 620a and 620b, among the representative images 620a, 620b, 620c, 620d, and 620e, the controller 180 may extract video having a play section corresponding to the some images 620a and 620b of the second portion video 620.

Thereafter, as illustrated in (c) of FIG. 6B, when a touch input is applied to a storage icon 650a for storing the extracted video, the controller 180 may link the extracted video to a still image. In this case, as illustrated in (d) of FIG. 6B, in the still image, the extracted video may be linked to the region in which the second object 420 is displayed, and stored.

Meanwhile, the controller 180 may generate a still image by linking the first and second portion videos having different play sections.

For example, as illustrated in (a) of FIG. 6C, the controller 180 may link a video having a first play section 650 in the first portion video as illustrated in (a) of FIG. 6C and a video having a second play section 660 different from the first play section 650 in the second portion video as illustrated in (b) of FIG. 6C to the still image.

In this case, the video having the first play section 650 of the first portion video and the video having the second play section 660 of the second portion video may be linked to the still image as illustrated in (c) of FIG. 6C. In this case, the video having the first play section 650 of the first portion video and the video having the second play section 660 of the second portion video may have different play start points in time. That is, even though the video having the first play section 650 and the video having the second play section 660 of the second portion video simultaneously start to be played, the videos captured at different time intervals may be played. Playing of the video will be described in detail with reference to FIGS. 10A to 10D.

Meanwhile, in a case in which the first portion video and the second portion video are linked to the still image, the controller 180 may link voice information related to the first portion video and voice information related to the second portion video to the still image together.

In detail, the controller 180 may extract voice information from video captured in the cinema graph mode. Thereafter, the controller 180 may extract first voice information related to the first object included in the first portion video and second voice information related to the second object included in the second portion video.

Here, the controller 180 may extract a specific voice related to a specific object on the basis of the image information and sound characteristics (e.g.,. a frequency, an amplitude, and the like) included in the video. For example, the controller 180 may detect a movement of a mouth shape of the first object and extract first voice information related to the first object from the voice information on the basis of the movement of the mouth shape. Or, the controller 180 may link a specific object and a specific voice according to a start point and an end point of the movement of the mouth shape, stress of voice information, user's movement, and the like, in addition to the movement of the mouth shape.

Or, in a case in which video is captured using a directional speaker, the controller 180 may extract voice information input at a position corresponding to a position of a specific object through the directional speaker.

Here, when a partial play section of video is extracted in such a manner as described above, the extracted voice information may be voice information corresponding to the play section.

In this manner, the controller 180 may link only voice information related to the specific object, not every voice information included in the video, to the still image. In this case, the user may have a feeling as if the specific object is alive in the still image.

Thus, the user may view videos of different time slots, not the videos of the same time slot, through the single still image. Thus, the user may view the still image in a time-distorted form.

Figure 7A:
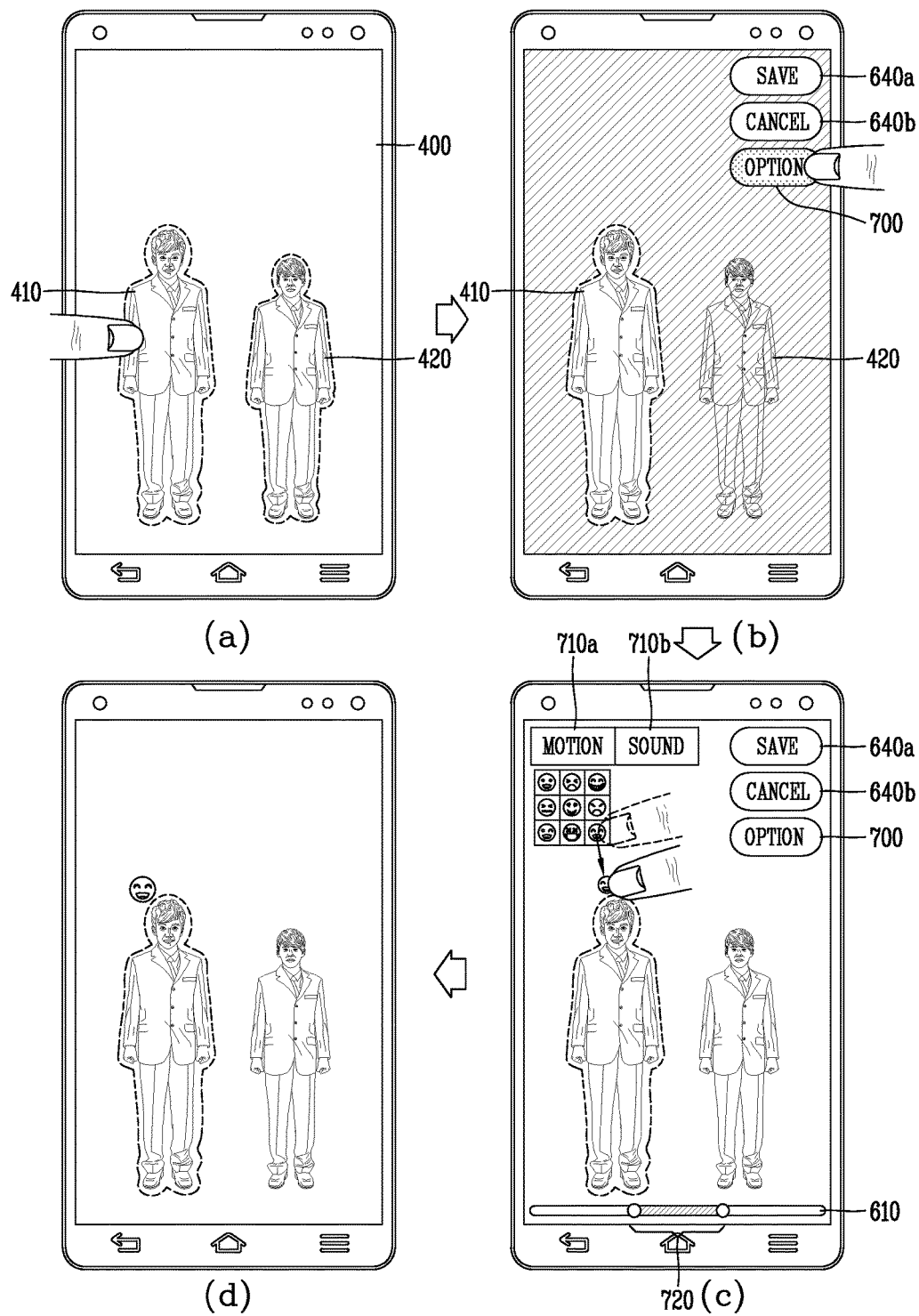
FIGS. 7A and 7B are conceptual views illustrating a method of combining an emoticon or a sound to a captured still image in a mobile terminal related to the present disclosure.
Figure 7B:
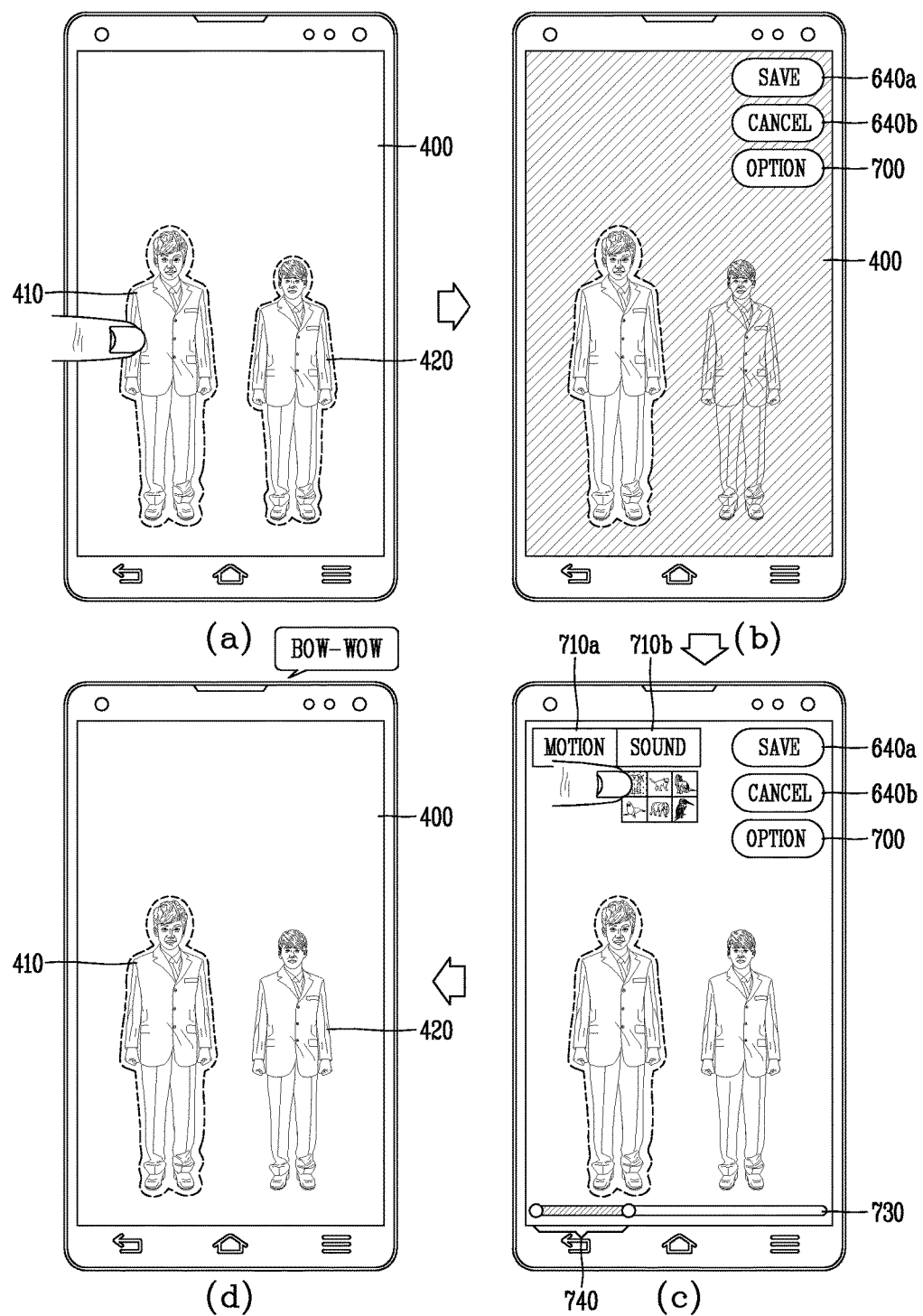

FIGS. 7A and 7B are conceptual views illustrating a method of combining an emoticon or voice to a captured still image in a mobile terminal related to the present disclosure.

The controller 180 may add a voice, an emoticon, an animation effect, and the like, to the region to which the video is linked in the still image captured in the cinema graph mode. Here, the emoticon refers to previously stored images in the image.

That is, the controller 180 may link an additional effect together with the video, as well as the video, to the still image.

For example, as illustrated in (a) of FIG. 7A, when a region in which the first object 410 to which video is linked is selected from the still image, the controller 180 may display editing objects for editing the region in which the first object 410 is displayed.

That is, as illustrated in (b) of FIG. 7A, the controller 180 may display storage and cancel icons 640a and 640b and an editing icon 700 on the still image. Here, as illustrated in (c) of FIG. 7A, when a touch input is applied to the editing icon, editing menus 710a and 710b may be displayed. The editing menus 710a and 710b may include a menu for inserting an emoticon to the video and a menu 710b for inserting a voice. In addition, the editing menus 710a and 710b may further include menus related to video editing.

When the menu for inserting an emoticon is selected, the controller 180 may display a list of previously stored emoticons. The user may insert emoticons to the video using the list of emoticons.

Here, as illustrated in (c) of FIG. 7A, the controller 180 may also set a play section 720 in which the selected emoticon is to be displayed, on the basis of a user request. That is, the user may select a time during which the emoticon is to be displayed in the video.

Similarly, the user may link previously stored new voice information, not the voice information of the video, to the video.

For example, as illustrated in (c) of FIG. 7B, the controller 180 may add voice information having a sound of "bow-wow" to a specific play section 720. In this case, when the video linked to the still image is played, the controller 180 may output the voice information of "bow-wow", not the voice information stored in the video.

Also, as illustrated in (c) of FIG. 7B, the controller 180 may set a play section (740) during which selected voice information is to be output on the basis of a user request.

That is, the user may select a time during which voice information is to be output in the video.

In addition, the controller 180 may set various effects such as a fade-in effect or a fade-out effect, as an animation effect, in the video.

Accordingly, the user may generate a still image having various visual fun.

Figure 8A:
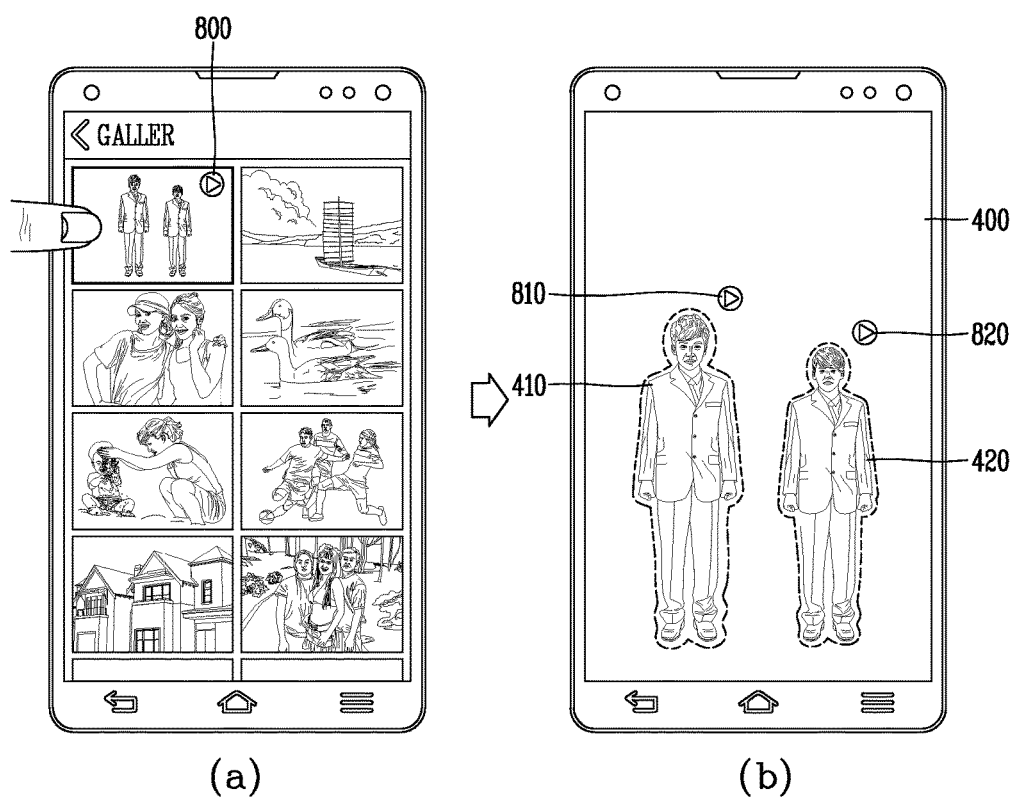
FIGS. 8A and 8B are conceptual views illustrating a method of displaying a case in which a partial video is associated with a captured still image in a mobile terminal related to the present disclosure.
Figure 8B:
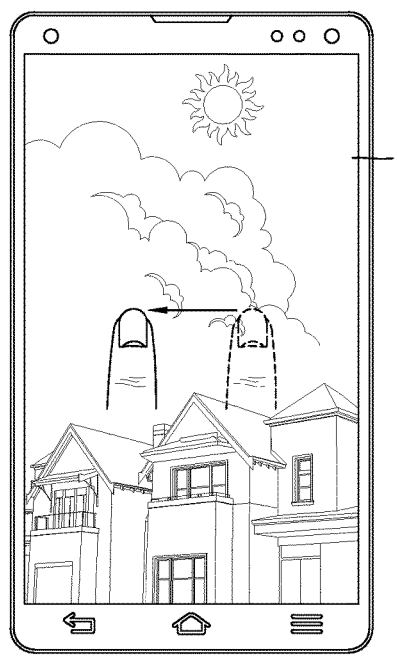
Figure 8B:
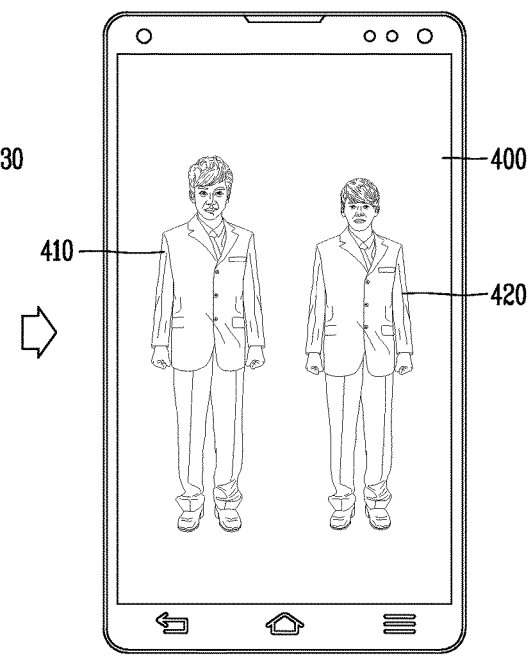
Figure 8B:
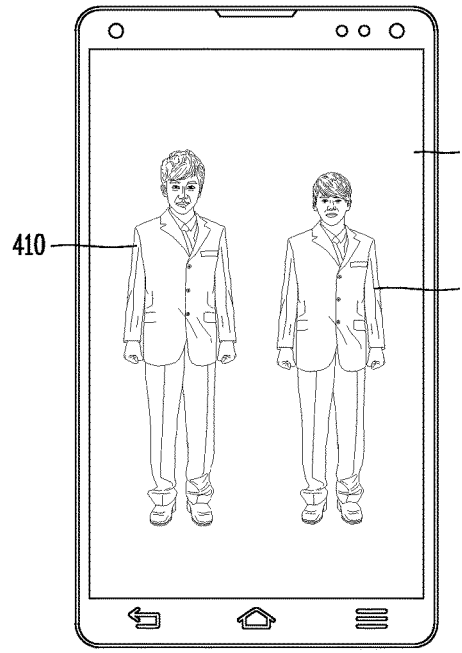
Figure 8B:
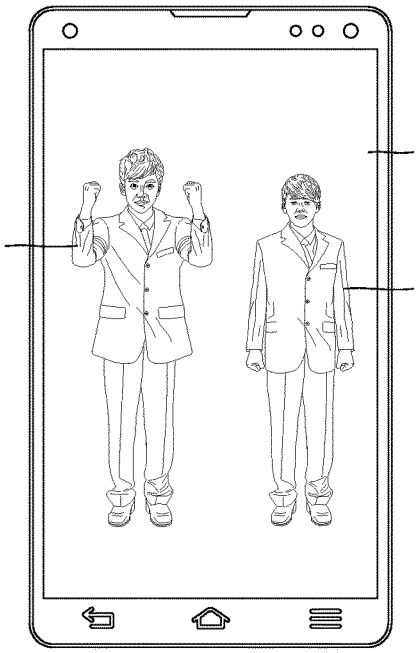

FIGS. 8A and 8B are conceptual views illustrating a method of displaying a case in which a partial video is associated with a captured still image in a mobile terminal related to the present disclosure.

When an image is captured in the cinema graph mode, the controller 180 may store the same in the memory 170 of the mobile terminal.

Here, when an image is captured in the cinema graph mode, the controller 180 may store the captured image in the same folder as that of an image captured in a different image capture mode, that is, in the same repository, or may store the captured image in a new folder different from that of an image captured in a different mode.

Meanwhile, the user may check the images stored in the memory 170 through an application related to an image. The image-related application is an application providing a function such as displaying, editing, sharing, and deleting an image. The image-related application may be termed a photo application, a gallery application, and the like.

When the image-related application is executed, the controller 180 may display thumbnail images of a plurality of images stored in the memory 170 on the display unit 151.

Here, as illustrated in (a) of FIG. 8A, the controller 180 may display an icon 800 indicating a cinema graph image on a thumbnail image of an image captured in the cinema graph mode. Accordingly, the user may recognize an image captured in a general mode and the image captured in the cinema graph mode by intuition.

Also, as illustrated in (b) of FIG. 8A, when the image captured in the cinema graph mode is displayed on the display unit 151, the controller 180 may display icons 810 and 820 indicating a portion, of the image captured in the cinema graph mode, to which video is linked. Accordingly, the user may recognize a region that can be played in the still image by intuition.

Meanwhile, unlike the above description, the controller 180 may display the thumbnail image captured in the cinema graph mode in the same manner as that of the images captured in a different image capture mode. In this case, the user not recognize the image as the image captured in the cinema graph mode but recognize it as a general still image, on the thumbnail image.

However, when an image captured in the cinema graph mode is displayed on the display unit 151 according to a control command for displaying an image captured in the cinema graph mode, the controller 180 may automatically play at least a portion of videos linked to the image captured in the cinema graph mode.

For example, as illustrated in (a) of FIG. 7B, in a state in which an image 830 captured in an image capture mode, not in the cinema graph mode, is displayed on the display unit 151, the controller 180 may sense that a flicking input is applied. In this case, as illustrated in (b) of FIG. 7B, the controller 180 may display the image 400 captured in the cinema graph mode on the display unit 151.

As illustrated in (c) and (d) of FIG. 8B, when the image 400 captured in the cinema graph mode is displayed on the display unit 151, the controller 180 may automatically play a portion of the video linked to the image 400 captured in the cinema graph mode.

Accordingly, the controller 180 may allow the user to recognize that the image currently displayed on the display unit 151 is an image captured in the cinema graph mode.

In the above, the method of displaying an image captured in the cinema graph mode has been described. In this manner, the user may recognize the image captured in the cinema graph mode by intuition.

Hereinafter, a method of playing an image captured in the cinema graph mode will be described. FIGS. 9A to 9D are conceptual views illustrating a method of playing an image captured in the cinema graph mode in the mobile terminal related to the present disclosure.

When a user's control command or a preset condition is satisfied, the controller 180 may play video linked to a still image captured in the cinema graph mode.

Here, even though the video linked to the still image is played, the controller 180 may continuously displayed the still image on the display unit 151. That is, the video linked to the still image may be played in a region of the still image.

Also, when playing of the video linked to the still image is terminated, the controller 180 may display the still image again on the display unit 151.

Or, when the video is played, the controller 180 may make the still image disappear from the display unit 151. When playing of the video is terminated, the controller 180 may display the still image again on the display unit 151.

Figure 9A:
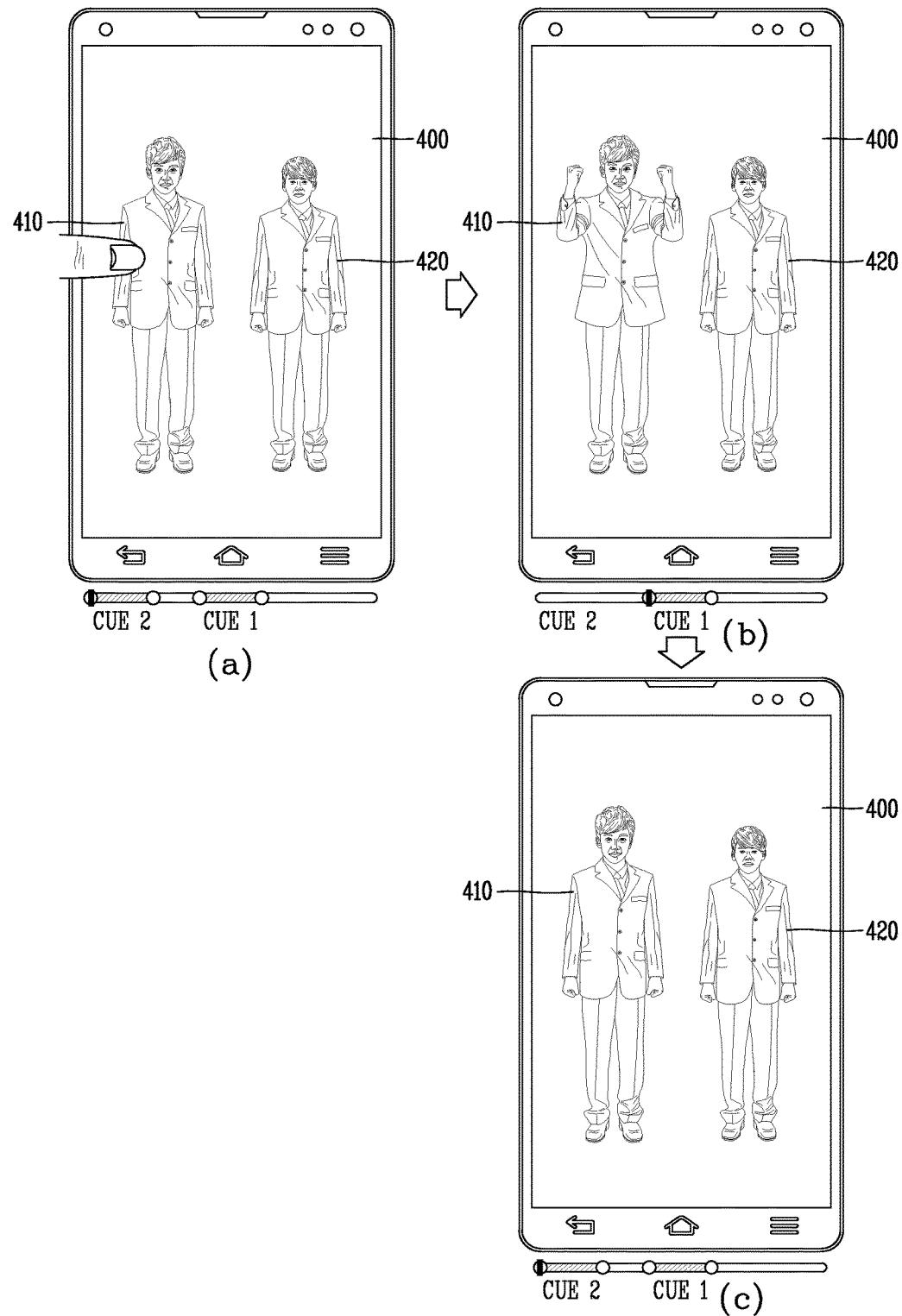

First, referring to (a) of FIG. 9A, the controller 180 may display a still image in which a first portion video is linked to the first object 410 and a second portion video is linked to the second object 420, on the display unit 151.

Here, as illustrated in (b) of FIG. 9A, in response to a touch input applied to the region in which the first object 410 is displayed, the controller 180 may play the first portion video. Here, the first portion video may be video to which a play section corresponding to a progress bar illustrated in (b) of FIG. 9A. Thus, the controller 180 may play the play section of the first portion video illustrated in (b) of FIG. 9A.

When playing of the first partial video is terminated, the controller 180 may display the still image again. Also, while the first portion video is being played, the second portion video may not be played. That is, the controller 180 may independently control the first portion video and the second portion video. According to this, in the present disclosure, an image moved when interacted with the user may be provided.

The controller 180 according to another embodiment of the present disclosure may play video linked to the still image when a preset condition is met.

Here, the preset condition may be a gaze sensing condition. The gaze sensing condition may be a condition in which user's eyes face a specific object. To this end, the controller 180 may receive a pupil image of the user through the camera, analyze a pupil image to detect a gaze direction.

Referring to (a) of FIG. 9B, the controller 180 may sense that the users gazes at the first object 410. In this case, as illustrated in (b) of FIG. 9B, the controller 180 may play the first portion video linked to the first object 410.

Meanwhile, while the first portion video is being played as illustrated in (b) of FIG. 9B, the controller 180 may sense that the user's gaze is moved to the second object 420. In this case, as illustrated in (c) of FIG. 9B, the controller 180 may stop playing the first portion video and start to play the second portion video.

Thus, the user may view that a portion of the still image on which he or she focuses is naturally moved. Thus, the user may view more lively still image.

Also, in a state in which the still image captured in the cinema graph mode is displayed on the display unit 151, when a preset period of time has lapsed, the controller 180 may automatically play video linked to the still image captured in the cinema graph mode without a separate control command. For example, as illustrated in (a) to (c) of FIG. 9C, the controller 180 may automatically play video linked to the still image captured in the cinema graph mode.

Meanwhile, in a case in which a plurality of videos are linked, the controller 180 may sequentially play the videos or may simultaneously play the videos. Play order of the videos may be set by the user in advance or may be generated randomly.

Figure 9C:
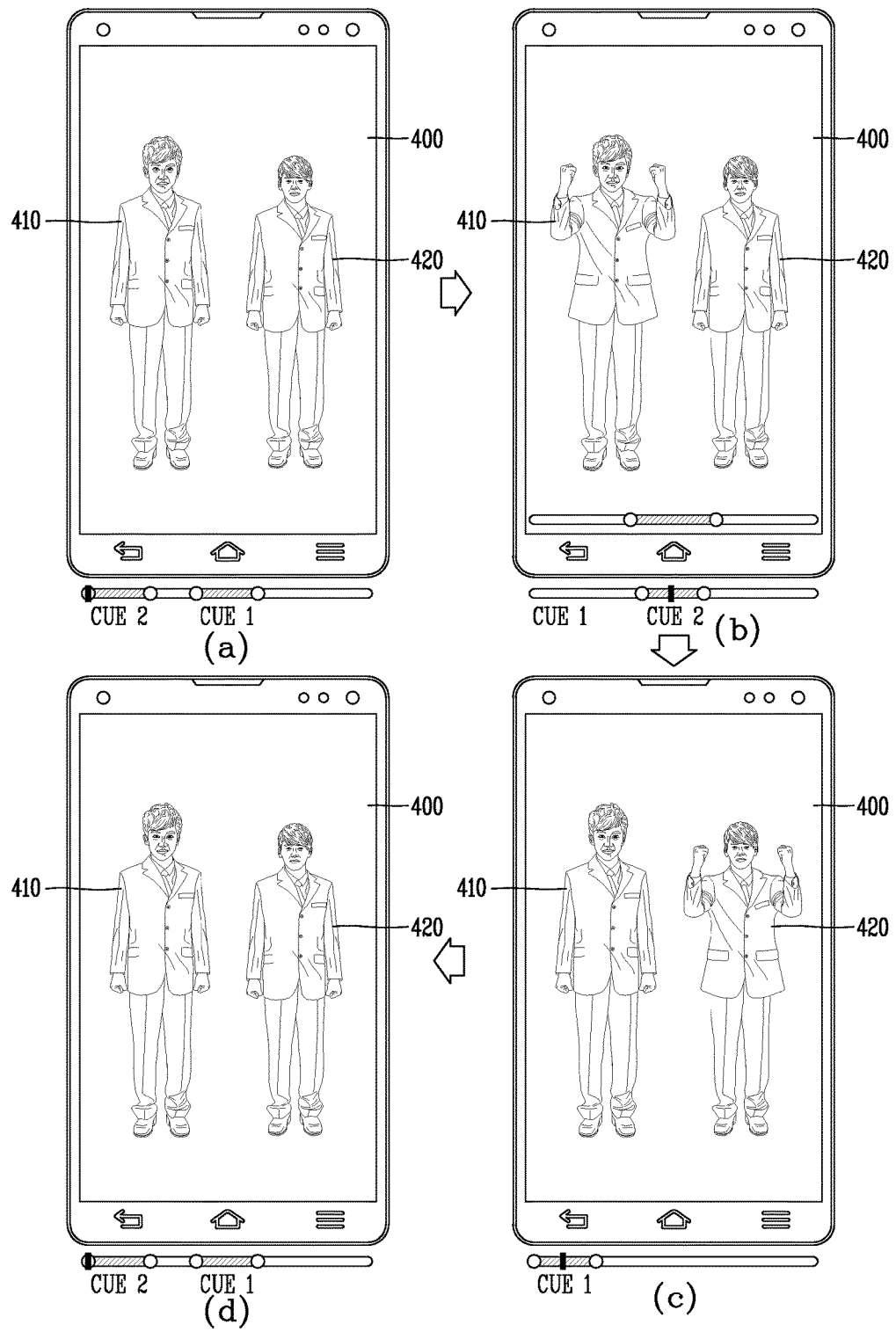

As illustrated in (d) of FIG. 9C, when playing of video is completed, the controller 180 may display the still image again.

Also, on the basis of different touch inputs, the controller 180 may play different play sections of video. Here, the different touch inputs may refer to touches different in touch schemes. For example, the different touch inputs may include touch scheme such as a force touch sensing pressure of a touch input, a 3D touch, a long touch, flicking, and the like.

Figure 9D:
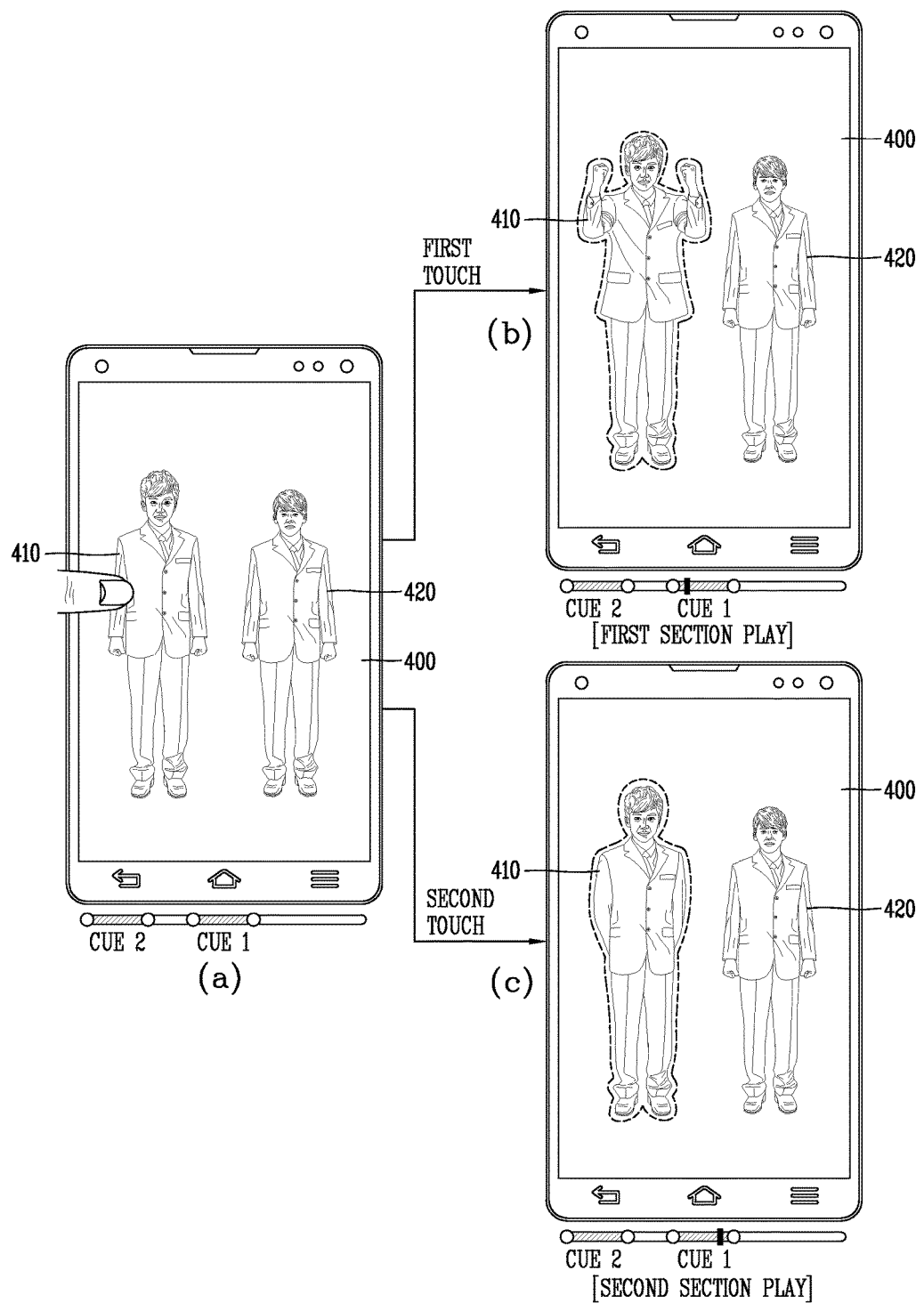

As illustrated in (a) of FIG. 9D, the controller 180 may play the first portion video on the basis of a touch input applied to the first object 410.

Here, the controller 180 may play a specific play section of the first portion video according to a scheme of the touch input applied to the first object 410. For example, as illustrated in (b) of FIG. 9D, in a case in which a first touch having a general scheme in which pressure of the touch input is not sensed is applied, the controller 180 may play a first play section of the first portion video.

In contrast, as illustrated in (c) of FIG. 9D, in a case in which a second touch having a scheme in which the touch input has pressure equal to or greater than preset pressure is applied, the controller 180 may play a second play section of the first portion video.

Here, the first play section may be set as a main part of the first portion video, and the second play section may be set as the entire play section of the video.

Meanwhile, although not shown, in a case in which the second play section is played according to the second touch, when video starts to be played, the controller 180 may provide a fade-in effect. Thus, the user may recognize that the entire video starts to be played by intuition.

In the above, the method of playing video linked to the still image has been described. In addition, the still image according to the present disclosure may play video in various manners.

Hereinafter, a method for utilizing images captured in the cinema graph mode will be described. FIGS. 10A to 10D are conceptual views illustrating embodiments in which a captured image is provided as a lock screen a mobile terminal related to the present disclosure, and FIGS. 11A and 11B are conceptual views illustrating embodiments in which a captured still image is provided as a background image of a home screen page a mobile terminal related to the present disclosure.

The controller 180 of the mobile terminal according to the present disclosure may set an image captured in the cinema graph mode, as a background image of a lock screen.

The lock screen refers to a screen displayed on the display unit 151 in a locked state of the mobile terminal. The locked state of the mobile terminal refers to a state in which user's inputting of a control command is limited. Conversely, an unlocked state of the mobile terminal refers to a state in which a locked state is released and a user's control command is able to be received.

The controller 180 may set a background image of the lock screen to an image captured in the cinema graph mode according to a user's control command. For example, as illustrated in (a) of FIG. 10A, a background image of the lock screen may be an image 400 captured in the cinema graph mode.

Figure 10A:
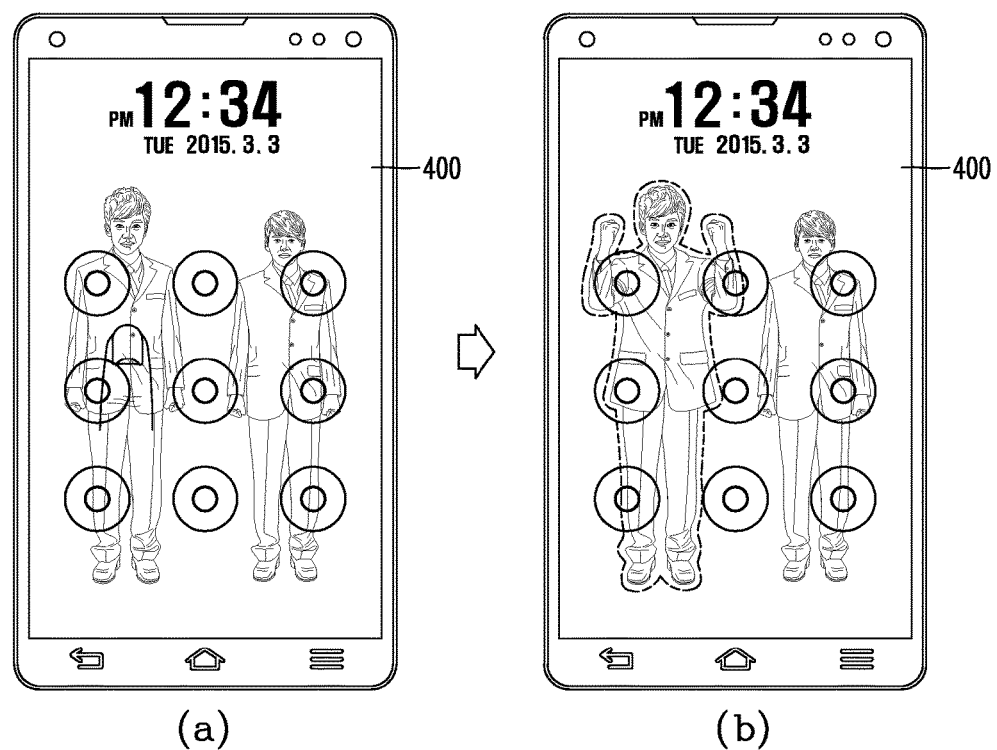
FIGS. 10A to 10O are conceptual views illustrating embodiments in which a captured image is provided as a lock screen a mobile terminal related to the present disclosure.
Figure 11B:
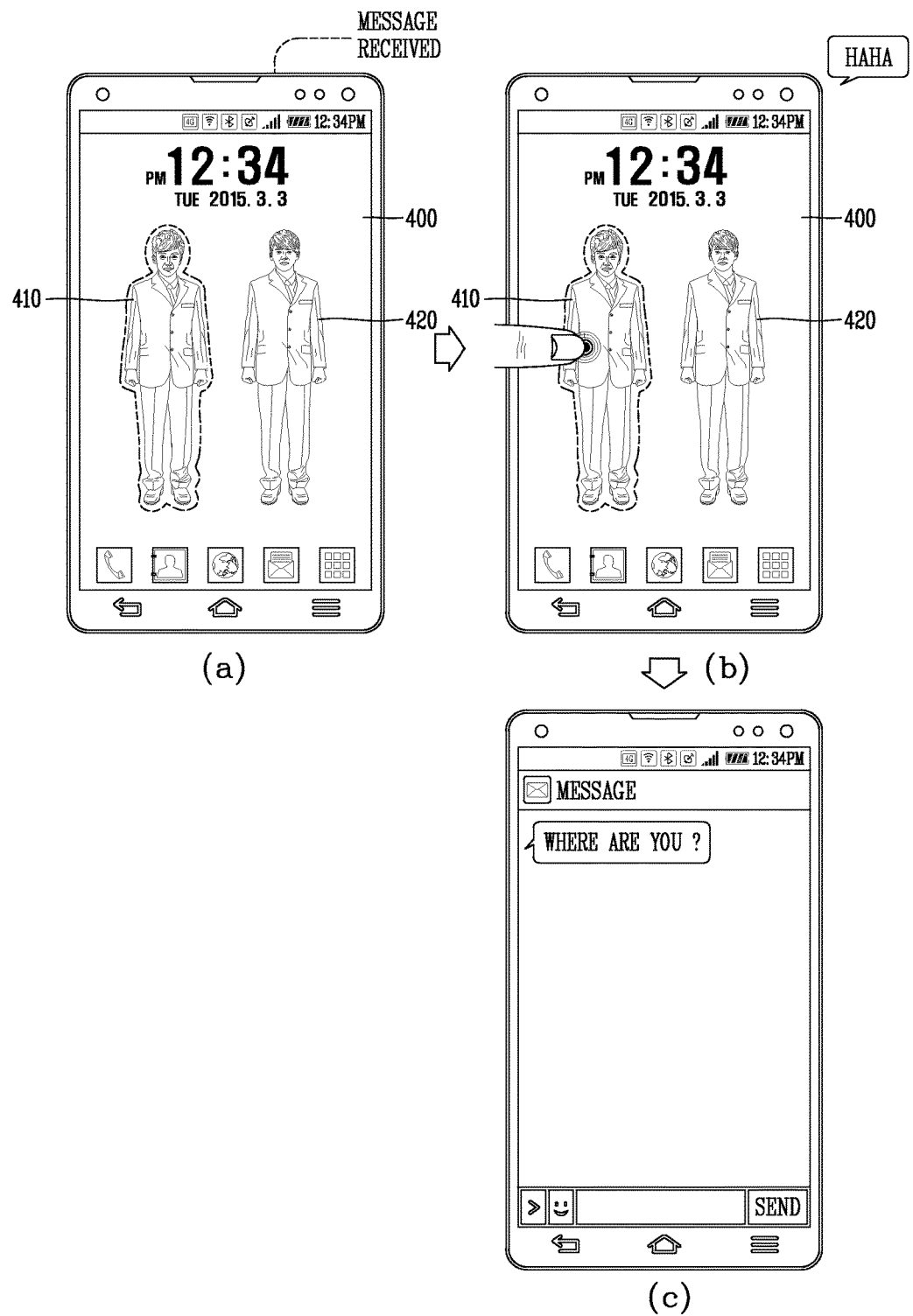

Here, as illustrated in (b) of FIG. 10A, when a touch input is applied to the image 400 captured in the cinema graph mode set as the background image of the lock screen, the controller 180 may play video linked to the image 400 captured in the cinema graph mode in the locked state. That is, the user may view an image reacting to the user's input.

Figure 10B:
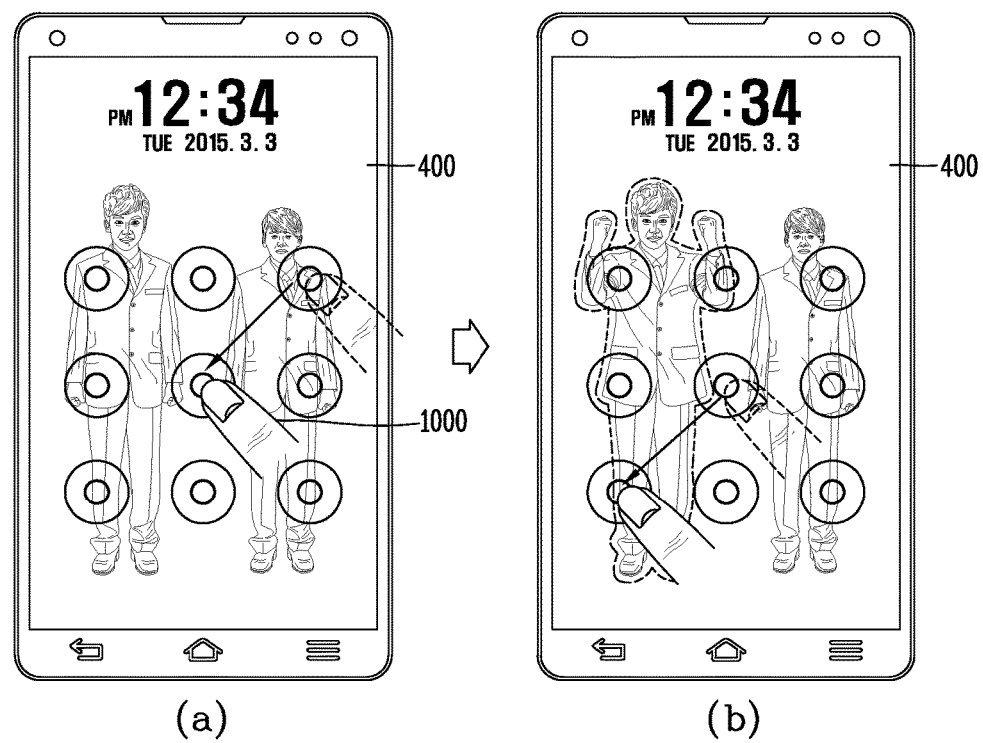

Meanwhile, in a case in which a user input for switching from the locked state to a released state is applied, the controller 180 may automatically play video linked to the image 400 captured in the cinema graph mode set as the background image of the lock screen. That is, as illustrated in FIG. 10B, in a case in which a pattern input 1000 for switching from a locked state to a released state is applied, video linked to the image 400 captured in the cinema graph mode set as the background image of the lock screen may be automatically played. Accordingly, the user may have a visual fun when the locked state is released.

Here, in a case in which a plurality of videos are linked to the image 400 captured in the cinema graph mode set as the background image of the lock screen, the controller 180 may sequentially play the plurality of videos in certain order. Here, the controller 180 may output even a sound of the video together. Thus, in the present disclosure, leakage of the lock pattern can be prevented through the video played regardless of an unlock pattern when the locked state is released.

Figure 10C:
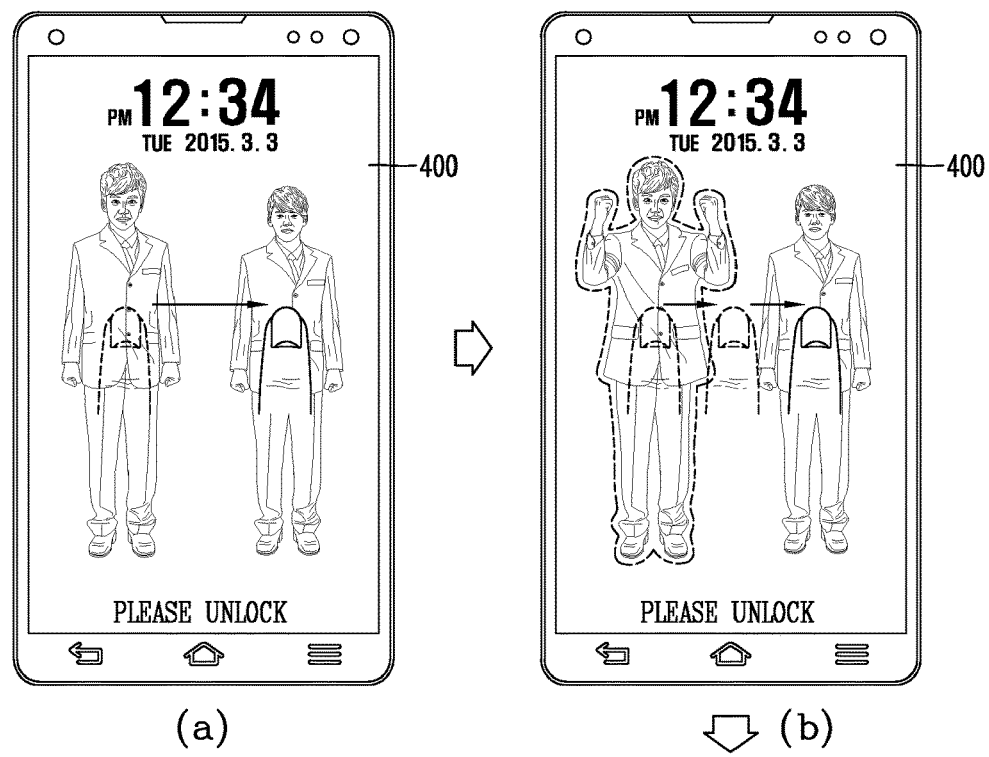
Figure 10C:
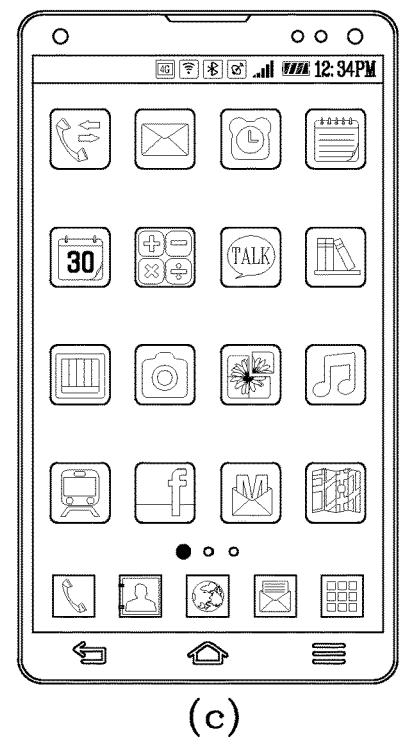

Also, as illustrated in FIG. 10C, in a case in which a plurality of videos are linked to the image 400 captured in the cinema graph mode set as the background image of the lock screen, the controller 180 may generate an unlock pattern using regions to which the videos are linked.

In this case, as illustrated in FIG. 10C, when a touch is applied to a region to which each video is linked, each video is played, and here, when a pattern generated by the touch pattern matches a preset pattern, the controller 180 may switch the locked state to a released state.

In another embodiment of the present disclosure, the controller 180 may set the image 400 captured in the cinema graph mode, as a background image of a home screen page. Here, the home screen page refers to an idle screen displayed in an idle state of the mobile terminal.

Meanwhile, the controller 180 may set a region of the image 400 captured in the cinema graph mode, to which video is linked, as notification information indicating occurrence of a specific event. In detail, when a specific event occurs, the controller 180 may play video linked to the image 400 captured in the cinema graph mode to utilize it as notification information indicating occurrence of the specific event.

For example, the controller 180 may link a message reception event and the first portion video. Here, as illustrated in (a) of FIG. 11A, in a state in which the image 400 captured in the cinema graph mode is set as a background image of a home screen page, the controller 180 may sense that a message reception event occurs. In this case, as illustrated in (b) of FIG. 11A, the controller 180 may play the first portion video. Also, the controller 180 may output sound of the first portion video together. That is, the controller 180 may inform the user about message reception by outputting a sound of video, instead of outputting a notification signal indicating the message reception.

As illustrated in (c) of FIG. 11A, when a touch input applied to the first portion video while the first portion video is being played, the controller 180 may display summary information of the received message. Summary information of the received message may be contents of the message or sender information. Here, the controller 180 may stop playing the first portion video.

Also, the controller 180 may also display a delete icon 1100 for making the summary information of the received message disappear from the display unit 151. As illustrated in (d) of FIG. 11A, when the delete icon 1100 is selected, the controller 180 may make the summary information of the message disappear from the display unit 151.

Meanwhile, when touch inputs of different schemes are applied to the first portion video, the controller 180 may perform different functions related to an event. The touch inputs of different schemes may be a short touch, a long touch, a multi-touch, a double touch, a 3D touch, and the like.

For example, as illustrated in (b) of FIG. 11A, when a short touch input applied to the first portion video is sensed, the controller 180 may display summary information of the received message.

Also, as illustrated in (b) of FIG. 11B, when a long touch input applied to the first portion video is sensed, the controller 180 may execute a message application and display an execution screen of the message application on the display unit 151.

In this manner, in the present disclosure, the video linked to the still image may be utilized in various manners.

As described above, in the mobile terminal according to the present disclosure, more realistic image can be produced by capturing a movement of objects included in an image.

Also, in the mobile terminal according to the present disclosure, by moving objects included in an image through interaction with the user, an image reacting to the user may be provided. Thus, the user may be provided with a stereoscopic image, not a 2D image.

Also, in the mobile terminal according to the present disclosure, by linking video having different play sections to a still image, a still image in a time-distorted form may be provided.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered to broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a camera;
a display; and
a controller configured to:
cause the display to display a preview of an image received by the camera, wherein the image includes a first object corresponding to a first subject and a second object corresponding to a second subject;
capture a still image of the image received by the camera;
capture a video of the image received by the camera;
link a first portion of the video of the image with a region of the image that includes the first object and link a second portion of the video of the image with a region of the image that includes the second object;
cause the display to display the still image; and
play the first portion of the video including the first object and play the second portion of the video including the second object, in response to an input received with regard to the still image.

2. The mobile terminal of claim 1, wherein the controller is further configured to:
cause the display to display a guide image on the preview image, wherein the guide image indicates a subject among the first subject and the second subject satisfies a preset condition.

3. The mobile terminal of claim 1, wherein the controller is further configured to:
link the first portion of the video with the region of the image when an image capture command is received with regard to the first object.

4. The mobile terminal of claim 1, wherein the first portion of the video is a first play section of the video and the second portion of the video is a second play section of the video that is different from the first play section.

5. The mobile terminal of claim 1, wherein the controller is further configured to:
play the first portion of the video while the still image is displayed on the display, when a touch input is received at a region of the still image in which the first object is displayed.

6. The mobile terminal of claim 5, wherein the controller is further configured to:
cause the display to continue to display the still image on the display, when the first portion of the video is played.

7. The mobile terminal of claim 5, wherein the controller is further configured to:
cause the display to display the still image on the display after the playing of the first portion of the video is terminated.

8. The mobile terminal of claim 5, wherein the controller is further configured to:
play different sections of the first portion of the video according to touch inputs at respectively different locations of the region of the image that includes the first object.

9. The mobile terminal of claim 1, wherein the controller is further configured to:
cause the display to display an icon indicating the linking of the first portion of the video, wherein the icon is displayed proximate to the region of the image that includes the first object.

10. The mobile terminal of claim 1, wherein the mobile terminal is in any one of a locked state in which receiving a control command is limited or a released state in which receiving a control command is not limited, and wherein the controller is further configured to:
cause the display to display the still image linked to the first portion of the video as a lock screen indicating the locked state.

11. The mobile terminal of claim 10, wherein the controller is further configured to:
play the first portion of the video during the locked state while the still image is displayed on the display.

12. The mobile terminal of claim 10, wherein the controller is further configured to:
switch from the locked state to the released state in response to receiving a touch input at the display which matches a security pattern; and
play the first portion of the video and play the second portion of the video in a defined order in response to receiving the touch input that matches the security pattern.

13. The mobile terminal of claim 1, wherein the controller is further configured to:
play the first portion of the video in response to an occurrence of a specific event.

14. The mobile terminal of claim 13, wherein the controller is further configured to:
execute any of a plurality of different functions in response to receiving an associated one of a plurality of touch inputs at different locations of the first region of the image that includes the first object.

15. The mobile terminal of claim 13, wherein the controller is further configured to:
cause the display to display summary information related to the specific event when a first touch input is received at the region of the image that includes the first object; and
cause the display to display an execution screen of an application related to the specific event when a second touch input is received at the region of the image that includes the first object, wherein the second touch input is different from the first touch input.

16. An image display method for a mobile terminal having a camera and a display, the method comprising:
displaying, on the display, a preview of an image received by the camera, wherein the image includes a first object corresponding to a first subject and a second object corresponding to a second subject;
capturing a still image of the image received by the camera;
capturing video of the image received by the camera;
generating a composite image by linking a first portion of the video of the image with a region of the image that includes the first object and linking a second portion of the video of the image with a region of the image that includes the second object;

displaying, on the display, the still image; and displaying, on the display, the first portion of the video including the first object and displaying the second portion of the video including the second object, in response to an input received with regard to the still image.

17. The method of claim 16, further comprising:

displaying, on the display, a guide image on the preview image, wherein the guide image indicates a subject among the first subject and the second subject satisfies a preset condition.

18. The method of claim 16, further comprising:

displaying, on the display, the first portion of the video while the still image is displayed, when a touch input is received at a region of the still image in which the first object is displayed.

19. The method of claim 18, further comprising:

continuing the displaying of the still image when the first portion of the video is played.

20. The method of claim 18, further comprising:

displaying, on the display, different sections of the first portion of the video according to touch inputs at respectively different locations of the region of the image that includes the first object.

* * * * *